United States Patent
Hu

(10) Patent No.: US 11,301,157 B2
(45) Date of Patent: Apr. 12, 2022

(54) DATA ACCESS METHOD AND STORAGE ARRAY

(71) Applicant: Huawei Technologies Co., Ltd., Shenzhen (CN)

(72) Inventor: Pan Hu, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/859,234

(22) Filed: Apr. 27, 2020

(65) Prior Publication Data

US 2020/0257465 A1 Aug. 13, 2020

Related U.S. Application Data

(63) Continuation of application No. PCT/CN2017/120204, filed on Dec. 29, 2017.

(51) Int. Cl.
*G06F 3/06* (2006.01)

(52) U.S. Cl.
CPC ........... *G06F 3/0647* (2013.01); *G06F 3/064* (2013.01); *G06F 3/067* (2013.01); *G06F 3/0622* (2013.01); *G06F 3/0644* (2013.01); *G06F 3/0665* (2013.01); *G06F 3/0679* (2013.01)

(58) Field of Classification Search
CPC ...... G06F 3/0647; G06F 3/0622; G06F 3/064; G06F 3/0644; G06F 3/0665; G06F 3/067; G06F 3/0679
See application file for complete search history.

(56) References Cited

U.S. PATENT DOCUMENTS

| | | | |
|---|---|---|---|
| 9,779,015 B1* | 10/2017 | Oikarinen | G06F 16/10 |
| 2012/0254579 A1* | 10/2012 | Schroeder | G06F 3/0619 |
| | | | 711/171 |
| 2014/0281324 A1* | 9/2014 | Duluk, Jr. | G06F 12/08 |
| | | | 711/165 |
| 2014/0297921 A1 | 10/2014 | Chang | |

(Continued)

FOREIGN PATENT DOCUMENTS

| | | |
|---|---|---|
| CN | 104077235 A | 10/2014 |
| CN | 104461393 A | 3/2015 |

(Continued)

OTHER PUBLICATIONS

Gupta, A., "DFTL: A Flash Translation Layer Employing Demand-based Selective Caching of Page-level Address Mappings," vol. 44., No. 3., ACM, 2009, 12 pages.

(Continued)

*Primary Examiner* — Nanci N Wong
(74) *Attorney, Agent, or Firm* — Conley Rose, P.C.

(57) ABSTRACT

A disk array includes SSD of different page sizes and a virtual disk is constructed based on the SSDs of different page sizes. The constructed virtual disk formed by a hybrid-page chunk which includes a large-page chunk, a small-page chunk, and the small-page chunk, is not provided for the host for use, and is only used to migrate data corresponding to the large-page chunk. Based on the virtual disk formed by the hybrid-page chunk, the data with a large granularity can be stored in the SSD with a large page size, and data with a small granularity is migrated to the SSD with a small page size.

20 Claims, 16 Drawing Sheets

(56) References Cited

U.S. PATENT DOCUMENTS

| | | | | |
|---|---|---|---|---|
| 2014/0359238 A1* | 12/2014 | Imazaki | ................ | G06F 3/0644 |
| | | | | 711/162 |
| 2015/0301743 A1* | 10/2015 | Nagao | ................... | G06F 3/0605 |
| | | | | 711/113 |
| 2017/0004172 A1* | 1/2017 | Idei | ................... | G06F 16/24542 |
| 2018/0011642 A1* | 1/2018 | Koseki | ................ | G06F 11/1076 |
| 2018/0107598 A1* | 4/2018 | Prodromou | ........... | G06F 9/5016 |
| 2018/0121134 A1* | 5/2018 | Schuster | ............. | G06F 11/1048 |
| 2018/0173598 A1* | 6/2018 | Zeng | ..................... | G06F 3/0619 |
| 2019/0095136 A1* | 3/2019 | Okubo | ................ | G06F 12/0246 |

FOREIGN PATENT DOCUMENTS

| | | |
|---|---|---|
| CN | 105808157 A | 7/2016 |
| CN | 105988727 A | 10/2016 |
| CN | 106326132 A | 1/2017 |
| CN | 107273046 A | 10/2017 |
| EP | 3168736 A1 | 5/2017 |
| WO | 2011042940 A1 | 4/2011 |
| WO | 2013097618 A1 | 7/2013 |
| WO | 2016174729 A1 | 11/2016 |

OTHER PUBLICATIONS

Lee, S., "A Log Buffer-Based Flash Translation Layer Using Fully Associative Sector Translation," IEEE Transactions on Embedded Computing Systems, vol. 6, No. 3, Article 18, Jul. 2007, 27 pages.

Jiang, S., "S-FTL: An Efficient Address Translation for Flash Memory by Exploiting Spatial Locality," IEEE 27th Symposium on Mass Storage Systems and Technologies (MSST), 2011, pp. 1-12.

Xu, Z., et al., "CAST: A Page-Level FTL with Compact Address Mapping and Parallel Data Blocks," IEEE 31st International Performance Computing and Communications Conference (IPCCC), 2012, 10 pages.

Kim, J., et al., "A Space-Efficient Flash Translation Layer for Compactflash Systems," IEEE Transactions on Consumer Electronics, 2002, vol. 48, No. 2, pp. 366-375.

"RAID 2.0+ Techinical White Paper," HUAWEI OceanStor 18000 Enterprise Storage, RAID2.0+ Technical White Paper, No. 1, Sep. 6, 2013, 23 pages.

Lee, S., "LAST: Locality-Aware Sector Translation for NAND Flash Memory-Based Storage Systems," In Proceedings of the International Workshop on Storage and I/O Virtualization, Performance, Energy, Evalua-tion and Dependability (SPEED 2008), Feb. 2008, 7 pages.

* cited by examiner

| Large-page chunk logical page number | Data annotation | Access times | STA |
|---|---|---|---|
| 1 | 0 | 1 | N/A |
| 2 | 0 | 2 | N/A |
| 3 | 1 | 0 | YYYY |
| 4 | 0 | 10 | N/A |
| 5 | 0 | 3 | N/A |
| 6 | 0 | 4 | N/A |
| 7 | 0 | 0 | N/A |
| 8 | 0 | 1 | N/A |
| 9 | 0 | 2 | N/A |
| 10 | 0 | 3 | N/A |
| ... | ... | ... | ... |

| Small-page chunk logical page number | Access times |
|---|---|
| XX0 | 0 |
| XX1 | 3 |
| XX2 | 0 |
| XX3 | 0 |

FIG. 6

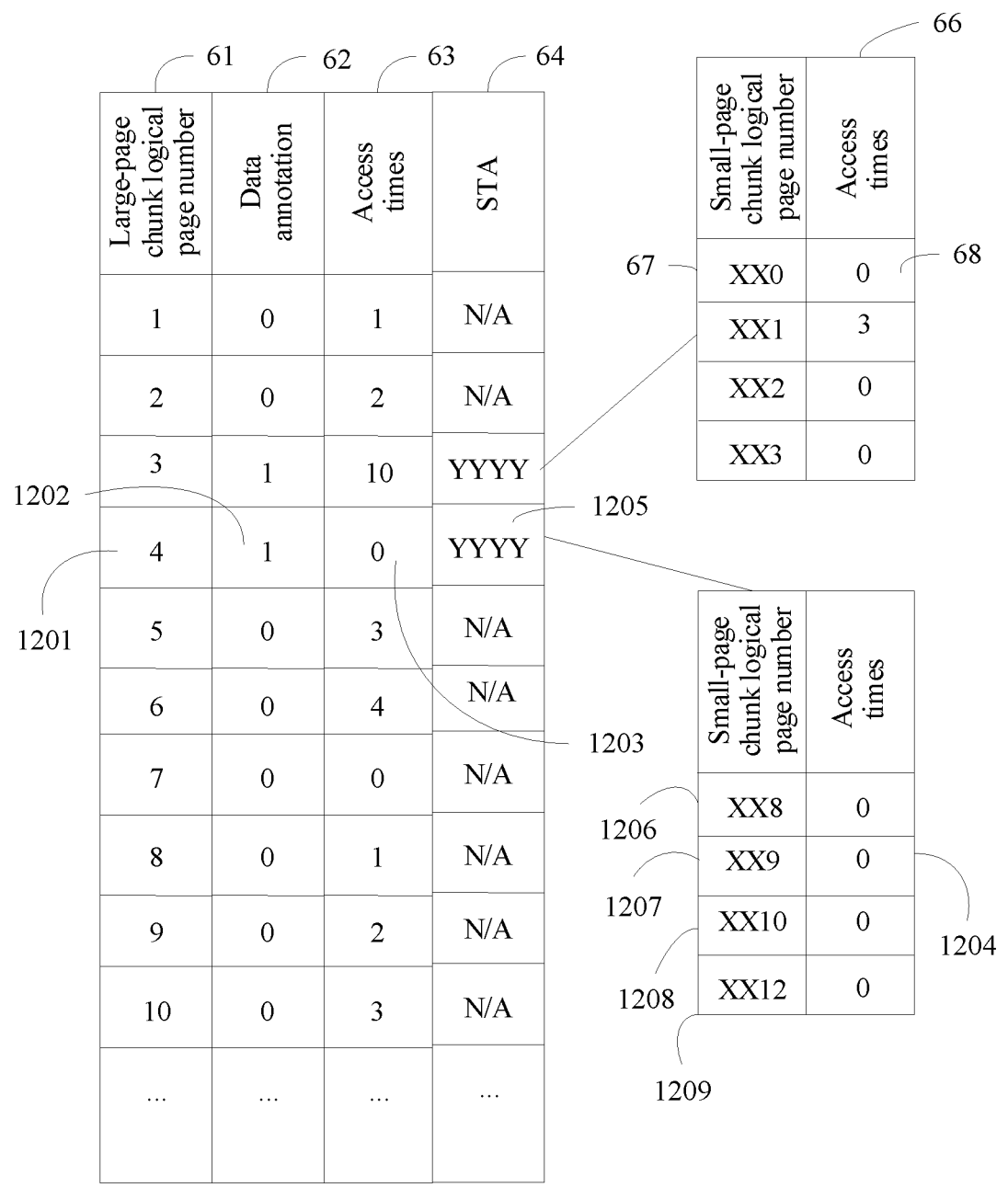

| Large-page chunk logical page number | Data annotation | Access times | STA |
|---|---|---|---|
| 1 | 0 | 1 | N/A |
| 2 | 0 | 2 | N/A |
| 3 | 1 | 10 | YYYY |
| 4 | 1 | 0 | YYYY |
| 5 | 0 | 3 | N/A |
| 6 | 0 | 4 | N/A |
| 7 | 0 | 0 | N/A |
| 8 | 0 | 1 | N/A |
| 9 | 0 | 2 | N/A |
| 10 | 0 | 3 | N/A |
| ... | ... | ... | ... |

| Small-page chunk logical page number | Access times |
|---|---|
| XX0 | 0 |
| XX1 | 3 |
| XX2 | 0 |
| XX3 | 0 |

| Small-page chunk logical page number | Access times |
|---|---|
| XX8 | 0 |
| XX9 | 0 |
| XX10 | 0 |
| XX12 | 0 |

FIG. 12

DATA ACCESS METHOD AND STORAGE ARRAY

CROSS-REFERENCE TO RELATED APPLICATIONS

This is a continuation of Int'l Patent App. No. PCT/CN2017/120204 filed on Dec. 29, 2017, which is incorporated by reference.

TECHNICAL FIELD

This disclosure relates to the storage field, and in particular, to a method for accessing data in a storage array and a storage array to which the access method is applied.

BACKGROUND

A solid-state disk (SSD) has advantages such as high performance, a low delay, low power consumption, and strong environment adaptability, and costs continuously decrease. Therefore, an all-flash array is more widely applied.

Different from an HDD, the SSD cannot perform over-writing at an original place, but original data needs to be erased to write new data. In addition, in the SSD, reading and writing are performed in a page, but erasing is performed in a physical block. Therefore, when data in the SSD is updated, updated data needs to be written into another location which is blank, and the original data is set to be invalid. When the SSD is full, a physical block with a relatively large amount of invalid data is selected for erasing. The physical block to be erased in the SSD may include a large quantity of valid pages. Therefore, data of the valid pages needs to be copied to another blank location before data in the physical block that needs to be erased is erased. Such a process is garbage collection. In the garbage collection process, because the data of the valid pages is copied to the another blank location, additional data writing is added. In other words, write amplification of the SSD is caused.

Because an access speed of the all-flash array is relatively fast, increasingly more host services are carried on the all-flash array, so that the SSD has an increasingly larger page. In addition, due to diversity of I/O access, a data size may differ much each time of I/O. For some data that is accessed relatively frequently and whose amount of data accessed each time is relatively small, using an SSD with a large page further increases write amplification.

SUMMARY

Embodiments of the present disclosure provide a data access method and device, to store small frequently-accessed data into an SSD with a relatively small page in a storage array, thereby reducing write amplification.

A first aspect of the present disclosure provides a data access method. The method is performed by a processor of a storage array. The storage array includes a plurality of first solid state disks SSDs and a plurality of second SSDs. A page size of each first SSD is greater than a page size of each second SSD. A logical address space constituted by the plurality of first SSDs is divided into a plurality of large-page logical blocks, and each large-page logical block is divided into a plurality of large-page logical pages based on the page size of the first SSD. A logical address space constituted by the plurality of second SSDs is divided into a plurality of small-page logical blocks, and each small-page logical block is divided into a plurality of small-page logical pages based on the page size of the second SSD. A hybrid-page logical block includes a large-page logical block and a small-page logical block. A logical unit provided for a host for use is constructed based on the large-page logical block in the hybrid-page logical block. A conversion table is set for each hybrid-page logical block, and the conversion table records a mapping relationship between a large-page logical page, a data annotation, and a small-page-index table address. The processor receives a first data access request sent by the host. The first data access request is used for accessing requested data stored in the storage array. The first data access request carries a logical address of the requested data. The processor searches for a first large-page logical page corresponding to the logical address and a corresponding logical page address in the first large-page logical page. The first large-page logical page belongs to a large-page logical block of a first hybrid-page logical block. Then the processor searches a conversion table corresponding to the first hybrid-page logical block for a first data annotation corresponding to the first large-page logical page. When the first data annotation is a small-page annotation, the processor obtains a small-page-index table based on a small-page-index table address that is recorded in the conversion table and that corresponds to the first large-page logical page, and determines, based on the logical page address and in small-page logical pages recorded in the small-page-index table, a small-page logical page corresponding to the first large-page logical page and an address in the small-page logical page. A storage space that corresponds to the small-page logical page corresponding to the first large-page logical page and that is of a second SSD is used to store data migrated from a storage space that corresponds to the first large-page logical page and that is of a first SSD. The processor obtains the requested data from the second SSD based on the small-page logical page and the address in the small-page logical page.

The conversion table is set for each hybrid-page logical block, and the data annotation is set in the conversion table. In this way, after the data in the first SSD is migrated to the second SSD, the data migrated to the second SSD can be found by using the data annotation recorded in the conversion table, so that hot data of a small page is accessed by using the conversion table.

In a possible implementation of the first aspect, the processor receives a second data access request sent by the host. The second data access request is used for accessing requested data stored in the storage array, and the second data access request carries a logical address of the requested data. The processor searches for a second large-page logical page corresponding to the logical address carried in the second data access request and a corresponding large-page address in the second large-page logical page. The second large-page logical page belongs to a large-page logical block of a second hybrid-page logical block. The processor searches a conversion table corresponding to the second hybrid-page logical block for a data annotation corresponding to the second large-page logical page; and when the data annotation corresponding to the second large-page logical page is a large-page annotation, obtains the requested data from the first SSD based on the second large-page logical page and the large-page address.

The to-be-accessed data obtained from the first SSD by using the data access request can be known by recording the data annotation in the conversion table.

In a possible implementation of the first aspect, the conversion table further records a quantity of access times of each large-page logical page. When a data amount of the requested data that corresponds to the second large-page logical page and that is obtained by the processor from the first SSD is less than a preset value, a quantity of access times of the second large-page logical page in the conversion table is increased by 1.

In this way, a quantity of access times of data with a relatively small access granularity can be counted, to migrate the data based on the counted quantity of times.

In a possible implementation of the first aspect, the processor periodically detects, in the conversion table, a large-page logical page whose quantity of access times is greater than a preset value, creates a small-page-index table for the large-page logical page whose quantity of access times is greater than the preset value, and records an address of the small-page-index table in the conversion table. The small-page-index table records N blank small-page logical pages, N is a quantity of small-page logical pages included in each large-page logical page, and N≥1. The processor migrates, to a storage space that corresponds to the blank small-page logical pages and that is of the second SSD, data that is stored in the first SSD and that corresponds to the large-page logical page whose quantity of access times is greater than the preset value; then modifies, to the small-page annotation, a data annotation of the large-page logical page whose quantity of access times is greater than the preset value; and sets, to zero, the quantity of access times of the large-page logical page whose quantity of access times is greater than the preset value.

In this way, data with a relatively small access granularity and a relatively large quantity of access times can be migrated to a second SSD with a relatively small page, to reduce write amplification.

In a possible implementation of the embodiments of the present disclosure, a small-page logical block in each hybrid-page logical block has a small-page logical page table, and the small-page logical page table records a correspondence between a small-page logical page included in each small-page logical block and a logical page in the second SSD. When obtaining the requested data from the second SSD based on the small-page logical page and the address in the small-page logical page, the processor obtains, from the small-page logical page table, a logical page in the second SSD and a logical page address in the second SSD that correspond to the small-page logical page and the address in the small-page logical page, and then generates an access sub-request. The access sub-request carries the logical page and the logical page address in the second SSD. Then the processor sends the access sub-request to the second SSD to instruct the second SSD to obtain the to-be-accessed data based on the logical page and the logical page address in the second SSD.

By using the small-page logical page table, a mapping relationship between the logical page in the small-page chunk and the logical page in the second SSD is established, so that it can be convenient to find the logical page that corresponds to the logical page in the small-page chunk and that is in the SSD, thereby finding the requested data.

In a possible implementation of the first aspect of the embodiments of the present disclosure, a large-page logical block in each hybrid-page logical block has a large-page logical page table, and the large-page logical page table records a correspondence between a large-page logical page included in each large-page logical block and a logical page in the first SSD. When obtaining the requested data from the first SSD based on the second large-page logical page and the large-page address, the processor obtains, from the large-page logical page table, a logical page that corresponds to the second large-page logical page and that is in the first SSD, determines a logical page address that corresponds to the large-page address and that is in the first SSD, and then generates an access sub-request. The access sub-request carries the logical page and the logical page address in the first SSD. Then the processor sends the access sub-request to the first SSD to instruct the first SSD to obtain the requested data based on the logical page and the logical page address in the first SSD.

By using the large-page logical page table, a mapping relationship between the logical page in the large-page chunk and the logical page in the first SSD is established, so that it can be convenient to find the logical page that corresponds to the logical page in the large-page chunk and that is in the SSD, thereby finding the requested data.

In a possible implementation of the embodiments of the present disclosure, the small-page-index table records a quantity of access times of each small-page logical page. The processor calculates, at an interval of a preset time, a variance and a mean value of quantities of access times corresponding to all the small-page logical pages in the small-page-index table; and if the variance is less than a threshold T1 and the mean value is greater than a threshold T2, migrates, to the first SSD corresponding to a large-page logical page corresponding to the small-page-index table, data that corresponds to the small-page logical pages and that is in the second SSD.

By counting the quantity of access times of each small-page logical page, and calculating the variance and the mean value of the quantities of access times corresponding to all the small-page logical pages, it can be determined whether the small-page logical pages have a feature of all being accessed. If the small-page logical pages have the feature of all being accessed, the data that corresponds to the small-page logical pages and that is stored in the second SSD is migrated to the first SSD, to improve data access efficiency.

A second aspect of the present disclosure provides a data access device. A technology of the data access device is basically the same as that of the data access method provided in the first aspect, and beneficial effects implemented by the data access device are also the same as those of the data access method provided in the first aspect. Details are not described herein again.

A third aspect of the present disclosure provides a storage array. The storage array includes a plurality of first solid state disks SSDs and a plurality of second SSDs, a page size of each first SSD is greater than a page size of each second SSD, a logical address space constituted by the plurality of first SSDs is divided into a plurality of large-page logical blocks, each large-page logical block is divided into a plurality of large-page logical pages based on the page size of the first SSD, a logical address space constituted by the plurality of second SSDs is divided into a plurality of small-page logical blocks, each small-page logical block is divided into a plurality of small-page logical pages based on the page size of the second SSD, a large-page logical block and a small-page logical block constitute a hybrid-page logical block, a logical unit provided for a host for use is constructed based on the large-page logical block in the hybrid-page logical block, a conversion table is set for each hybrid-page logical block, and the conversion table records a mapping relationship between a large-page logical page, a data annotation, and a small-page-index table address. The storage array further includes a processor and a memory. The memory is connected to the processor, and is configured to store a program instruction. The processor runs the program instruction to perform the data access method provided in the first aspect of the embodiments of the present disclosure.

A fourth aspect of the present disclosure provides a computer-readable medium, including a computer execution instruction. When a processor of a computer executes the computer execution instruction, the computer performs the data access method provided in the first aspect of the embodiments of the present disclosure.

BRIEF DESCRIPTION OF DRAWINGS

FIG. 6 is a schematic diagram of a conversion table corresponding to each hybrid-page chunk according to an embodiment of the present disclosure;

FIG. 12 is a schematic diagram of a conversion table after data in a large-page SSD is migrated to a small-page SSD according to an embodiment of the present disclosure.

DESCRIPTION OF EMBODIMENTS

Figure 1:
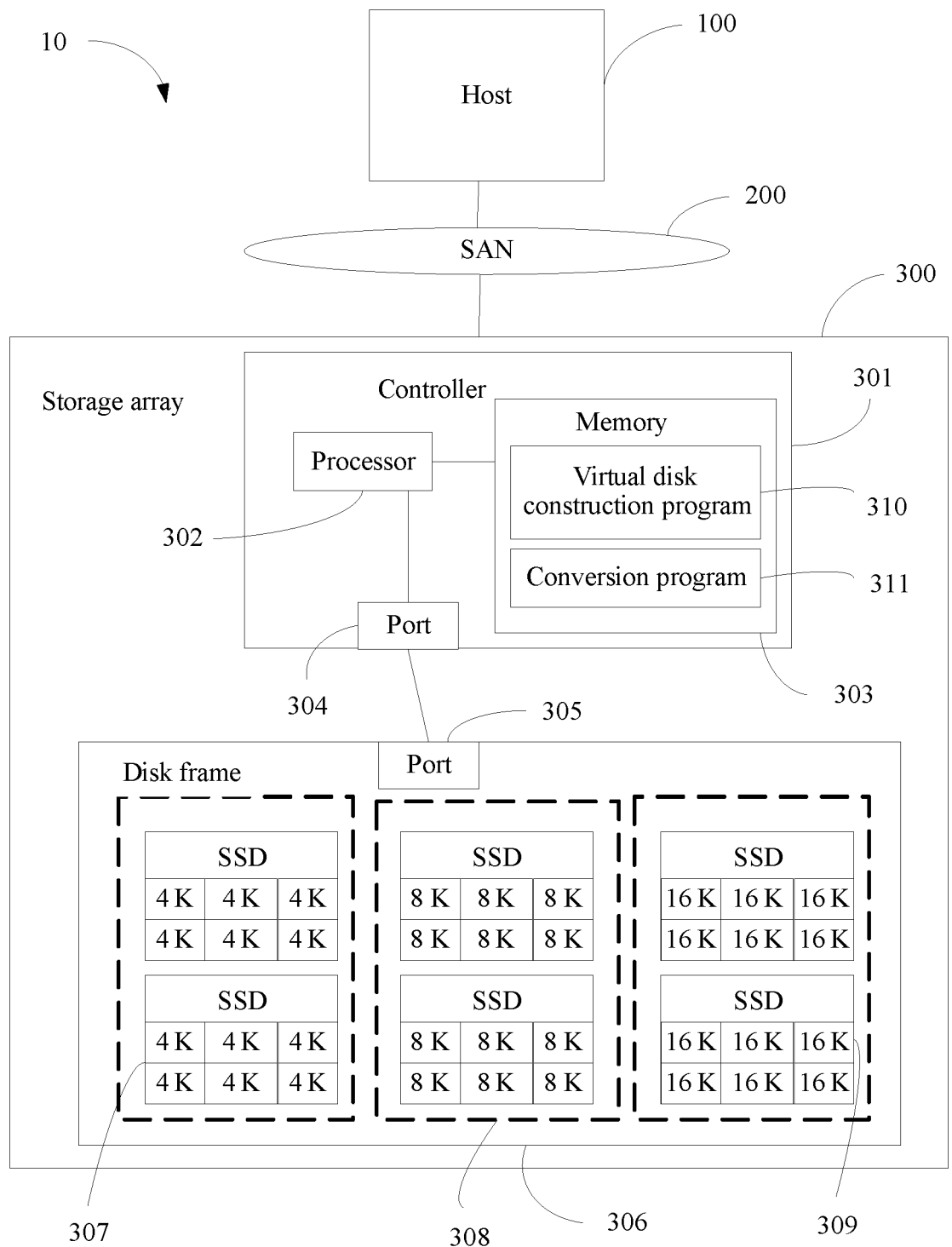
FIG. 1 is an architectural diagram of a storage system to which an embodiment of the present disclosure is applied.

FIG. 1 is an architectural diagram of a storage system 10 to which an embodiment of the present disclosure is applied. In the storage system 10, a host 100 may be connected to a storage array 300 by using a storage area network (SAN) 200 or another network. The host 110 runs various application software to provide different application services for a customer. The storage array 300 stores service data generated when an application in the host 100 is run. The storage array 300 includes a controller 301, a disk frame 306, and an SSD 307 of a 4 K page size, an SSD 308 of an 8 K page size, and an SSD of a 16 K page size that are installed on the disk frame 306. Herein, only the SSDs of the three page sizes are used as examples for description. In another embodiment, the storage array 300 may alternatively include an SSD of another page size. The controller 301 and the disk frame are connected by using ports 304 and 305. Each of the ports 304 and 305 may be a SAS port or a PCIE port. The controller 301 includes a processor 302, a memory 303, and the port 304. The processor 302 is configured to: execute various programs in the memory 303 to provide a data access service for the host 100, and manage the storage array 300. In this embodiment, the memory 303 stores a virtual disk construction program 310 and a conversion program 311. The processor 302 executes the virtual disk construction program 310 and the conversion program 311 to perform functions provided in this embodiment of the present disclosure. This is described below in detail with reference to flowcharts of FIG. 8 to FIG. 11.

By running the virtual disk construction program 310, the controller 301 may construct, based on the SSDs, a virtual disk, such as a logical unit (LU), visible to the host to provide a storage service for the host. In this embodiment, the virtual disk construction program 310 is an improvement made based on an existing RAID 2.0+ technology.

Figure 2:
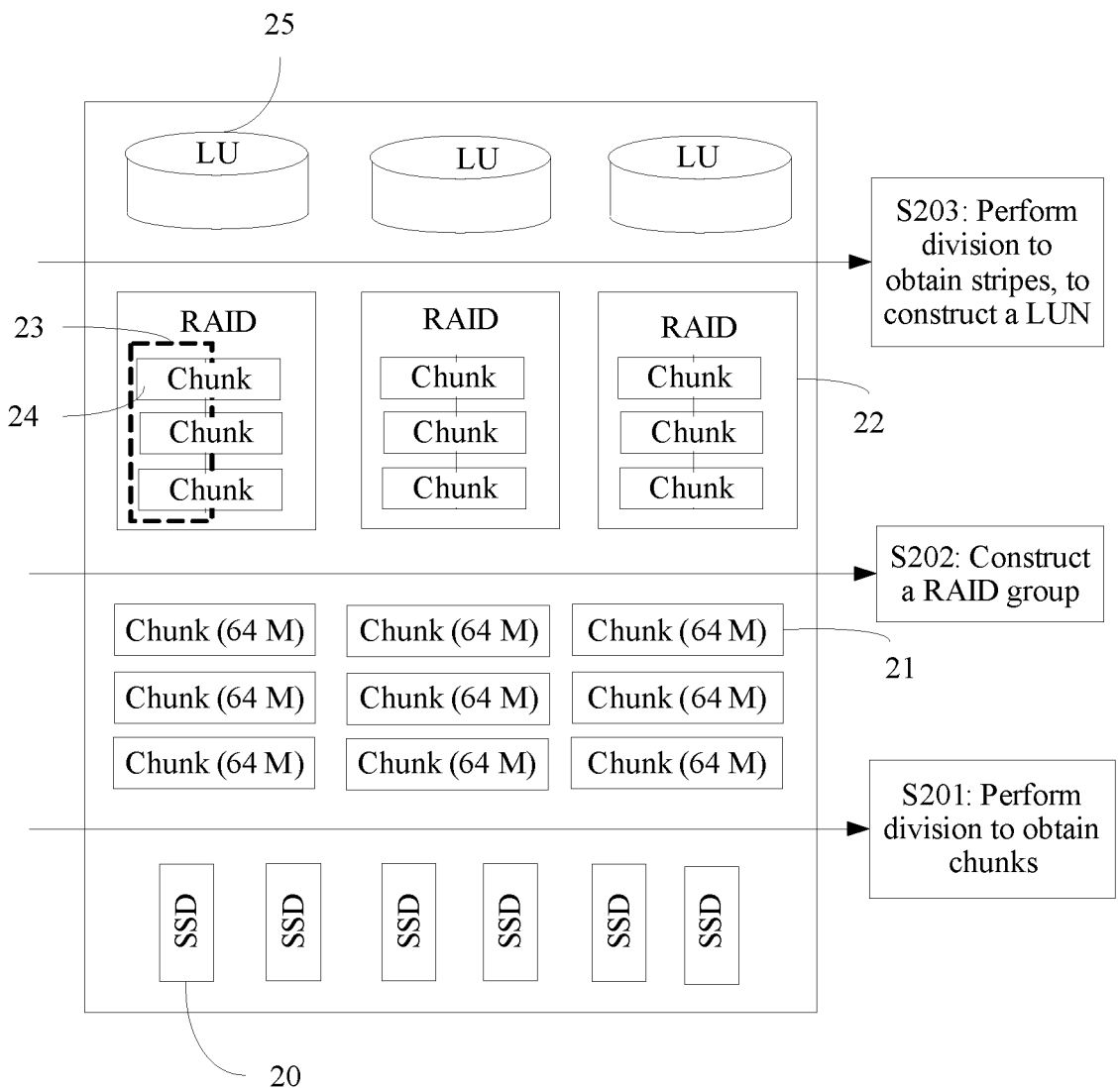
FIG. 2 is a schematic diagram of constructing a logical unit by using a RAID 2.0+ technology.

In the existing RAID 2.0+ technology, a virtual disk is constructed based on SSDs 20 of a same page size. For a specific method, refer to FIG. 2. When a virtual disk needs to be divided, for example, when a storage array is just connected to a host, or a virtual disk of the storage array needs to be re-divided, an array controller first divides SSDs 20 in the array into a plurality of chunks 21 of a same size (for example, 64 M), and records an SSD 20 to which each chunk 21 belongs and a corresponding physical address space in the SSD 20 (S201). Then the array controller selects a chunk 21 based on a preset RAID policy to construct a RAID group 22 (S202). The RAID policy may be any RAID policy, for example, a RAID 1-6 or a RAID 10. After the RAID group 22 is constructed, the array controller continues to construct an LU 25 based on the constructed RAID group 22 (S203). When the LU 25 is being constructed, the array controller first divides each RAID group 22 into a plurality of stripes 23. Each stripe 23 includes a part of a space of each chunk 21. As shown in FIG. 2, the stripe 23 includes a strip 24 in each of three chunks 21. Strips 24 in each stripe 23 are consecutively addressed to form an address space of each stripe. When an LUN is being constructed, a plurality of stripes 23 are selected from a plurality of RAID groups 22 to form an address space of the LUN, and a RAID to which each stripe 23 belongs and a location, of the stripe 23, in the RAID are recorded. The following uses FIG. 3 as an example for description. An LUN 36 includes three stripes, each stripe is of 96 M, and the three stripes constitute an address space of 288 M. A stripe 30 is from a RAID 33, a stripe 31 is from a RAID 34, and a stripe 32 is from a RAID 35. The address space of the LU is formed by sequentially addressing the three stripes. For example, an address range of the stripe 30 is 0 M to 95.999 M, an address range of the stripe 31 is 96 M to 191.999 M, and an address range of the stripe 32 is 192 M to 287.999 M. In this way, after I/O delivered by the host is received, based on a logical address that is of to-be-accessed data and that is carried in the I/O, a specific stripe that is of the LU and into which the logical address falls is determined, and a specific strip that is in the stripe and into which the logical address falls is further determined, so that a chunk to which the to-be-accessed data belongs and a location, of the I/O, in the chunk can be determined.

In comparison with the technology of directly constructing a RAID based on SSDs, in RAID 2.0+, a RAID is constructed based on chunks, and the chunks constituting the RAID are from different SSDs. In this way, after an SSD is faulty, an SSD on which another chunk in a RAID group including a chunk on the faulty SSD is located may participate in data reconstruction. Therefore, a data reconstruction speed is relatively fast.

Figure 4A:
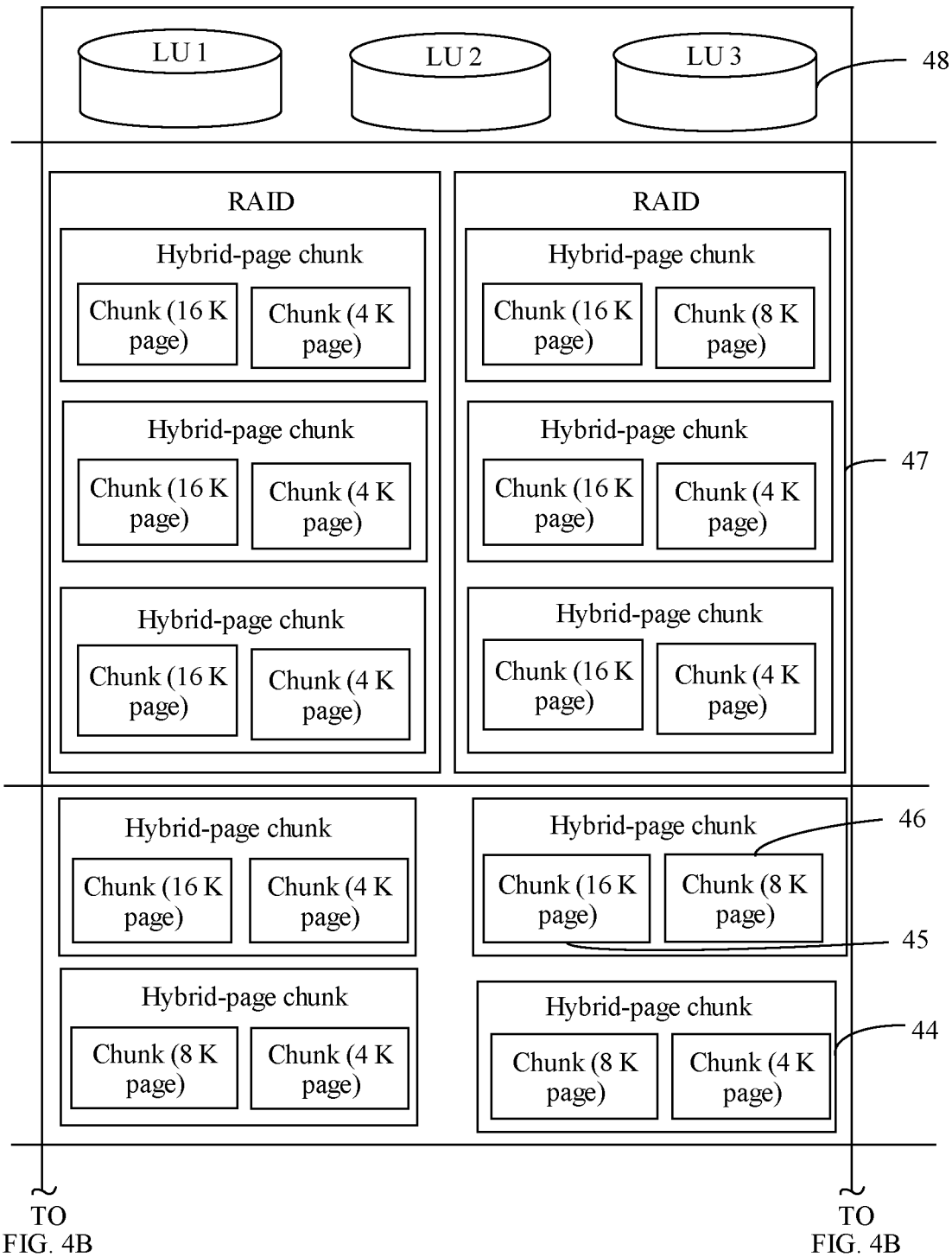
FIG. 4A and FIG. 4B are a schematic diagram of constructing a logical unit according to an embodiment of the present disclosure.
Figure 4B:
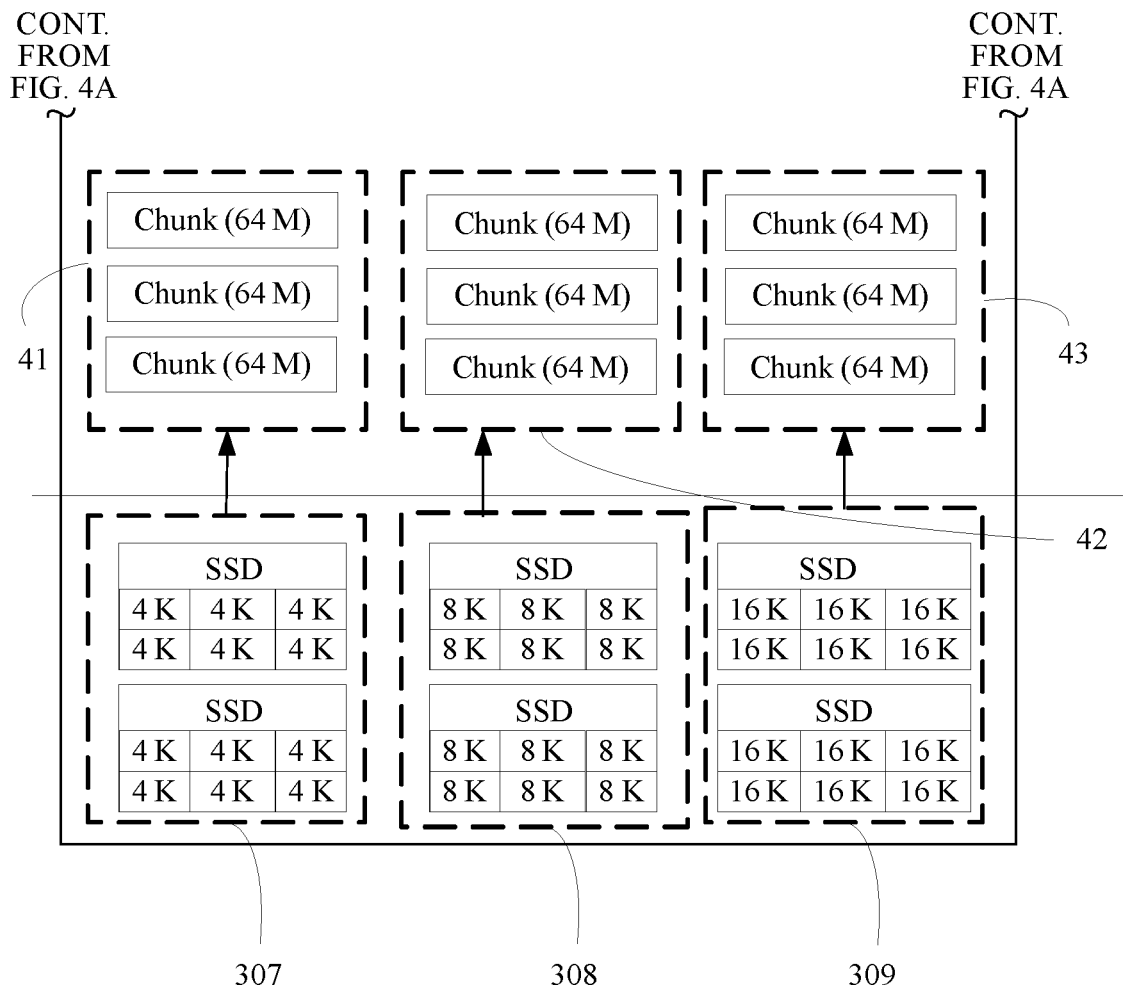

In this embodiment of the present disclosure, the RAID 2.0+ technology is improved in a manner that a virtual disk is constructed based on the SSDs of different page sizes included in the storage array 300. An improved program is the virtual disk construction program 310. As shown in FIG. 4A and FIG. 4B, after dividing the SSDs 307, 308, and 309 into chunks by running the virtual disk construction program 310, the processor 302 records chunks of a same page size together to form a chunk group, for example, a chunk group 41 obtained by dividing an SSD with a page of a 4 K size, a chunk group 42 obtained by dividing an SSD with a page of an 8 K size, and a chunk group 43 obtained by dividing an SSD with a page of a 16 K size. Then the processor 302 selects a chunk from each of two different chunk groups to form a hybrid-page chunk 44. In this way, each hybrid-page chunk 44 includes two chunks of different page sizes. A chunk from a chunk group with a larger page is a large-page chunk 45, and a chunk from a chunk group with a smaller page is a small-page chunk 46. Then the processor 302 constructs a RAID 47 based on the hybrid-page chunk 44. When the constructed RAID 47 is striped, only the large-page chunk 45 is striped. In other words, when a virtual disk is constructed by using the hybrid-page chunk 44, only the large-page chunk 45 is used to construct an LU, and the small-page chunk 46 is not used to construct the LU. In other words, the small-page chunk 46 is not provided for the host for use, and is only used to migrate data corresponding to the large-page chunk 45. Use of the small-page chunk in data migration is described below in detail.

Figure 5A:
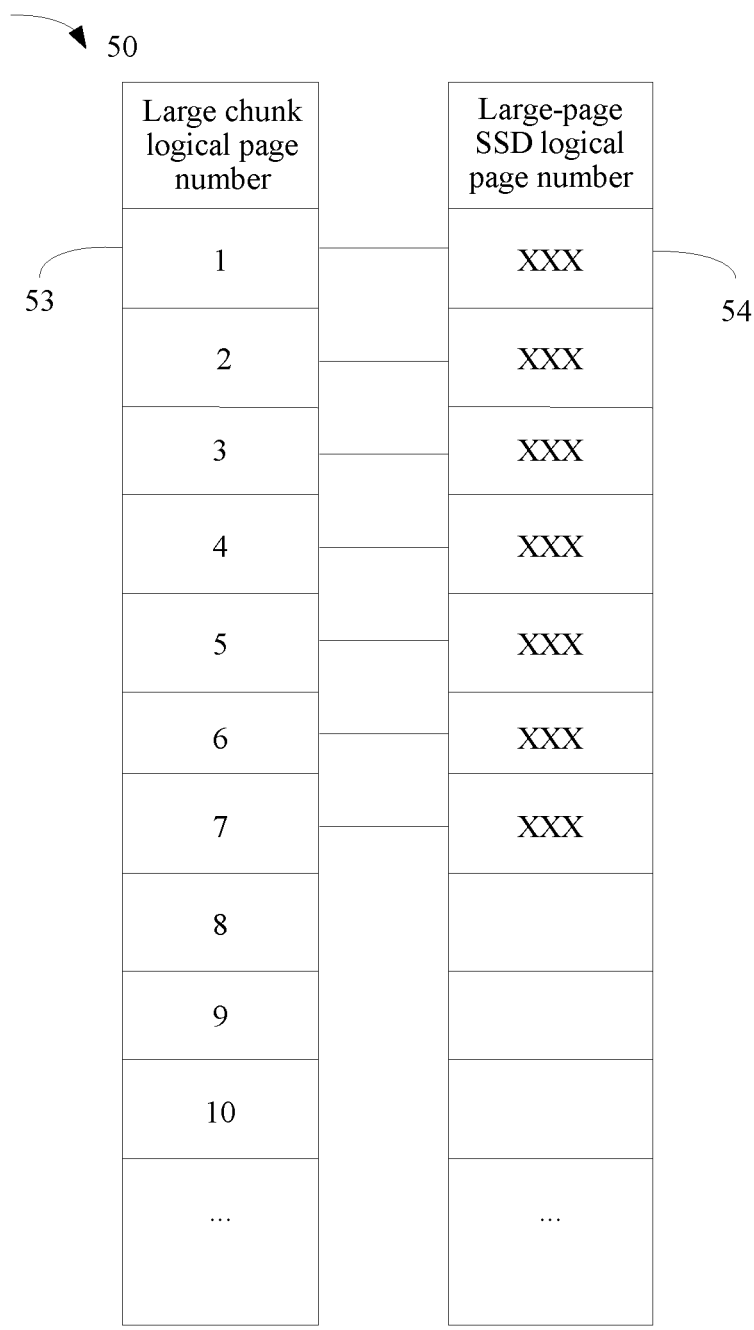
FIG. 5A and FIG. 5B are schematic diagrams of a large-page logical page table corresponding to a large-page chunk and a small-page logical page table corresponding to a small-page chunk in each hybrid-page chunk in FIG. 4A.
Figure 5B:
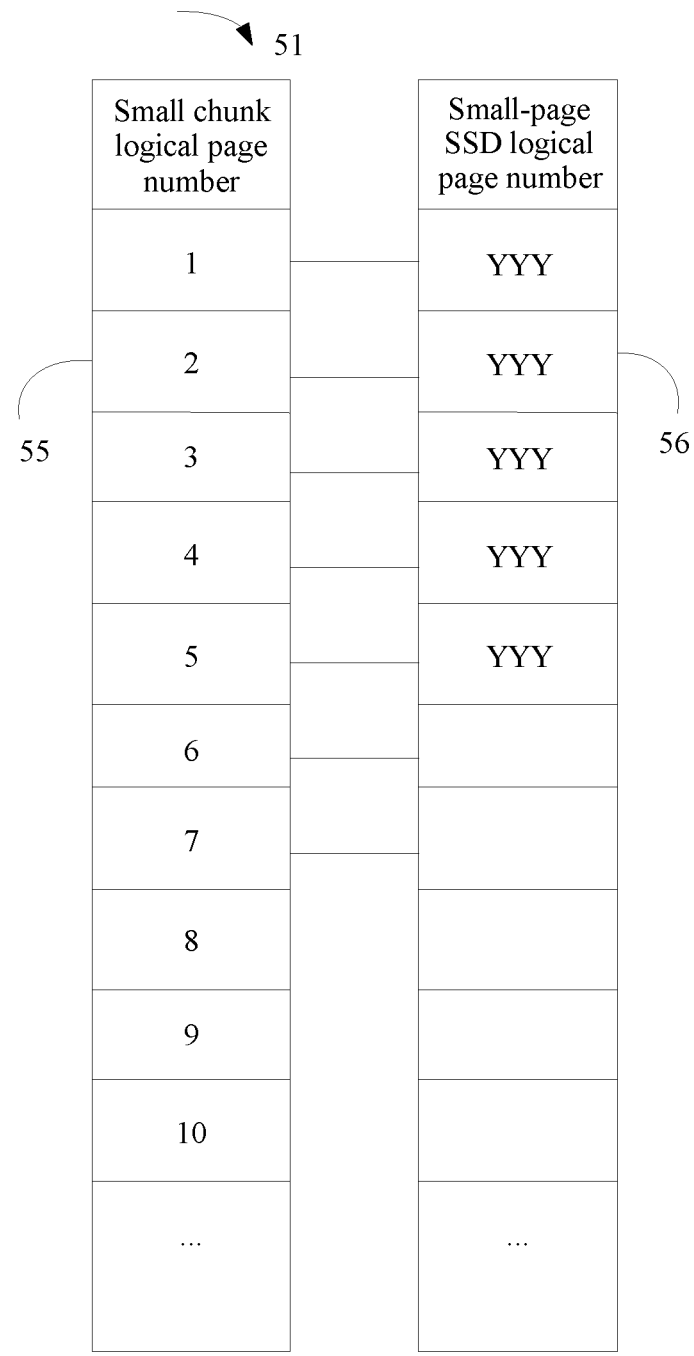

As shown in FIG. 5A and FIG. 5B, the controller 301 creates a large-page chunk logical page table 50 and a small-page chunk logical page table 51 for each hybrid-page chunk 44. The large-page chunk logical page table 50 records a correspondence between a logical page 53 in a large-page chunk and a logical page 54 in an SSD to which the large-page chunk belongs. The controller 301 divides each large-page chunk into a plurality of logical pages 53 based on an address space and a page size of the large-page chunk, and numbers each logical page 53 in an address order. The number is a large-page chunk logical page number. In each SSD, a table of mapping between a logical page number 54 and a physical page number that are in the SSD is maintained. A processor (not shown in the figure) of the SSD may find, in the mapping table based on an SSD logical page number carried in an access request, a physical page number corresponding to the logical page number, to find to-be-accessed data.

Similarly, the small-page chunk logical page table 51 records a correspondence between a logical page 55 in a small-page chunk and a logical page 56 in an SSD to which the small-page chunk belongs. An address space of the small-page chunk is divided into a plurality of logical pages 55 based on a page size of the small-page chunk, and each logical page 55 is numbered in an address order. The number is a small-page chunk logical page number.

The controller 301 further generates, for each hybrid-page chunk 44, a conversion table 60 shown in FIG. 6. The shown conversion table 60 includes a large-page chunk logical page number column 61, a data annotation column 62, an access times column 63, and a small-page-index table address (STA) column 64. The large-page chunk logical page number column 61 records a large-page chunk logical page number. The data annotation column 62 records a data annotation corresponding to each logical page 53. The data annotation includes a large-page annotation and a small-page annotation. The large-page annotation indicates that data corresponding to the logical page is stored in a large-page SSD corresponding to the large-page chunk, and is represented by 0 in this embodiment. The small-page annotation indicates that data corresponding to the logical page is stored in a small-page SSD corresponding to the small-page chunk, and is represented by 1 in this embodiment. When a length of data of an accessed logical page is less than a preset value, a value that is in the access times column and that corresponds to the logical page is increased by 1. The preset value may be 50% of a page size of the large-page chunk. When the data annotation corresponding to the logical page 53 is the small-page annotation, the small-page-index table address column 64 records an address 66 that is of a small-page-index table 65 corresponding to the logical page 53 and that is in the memory, the small-page-index table 65 can be found based on the memory address 66, and to-be-accessed data can be found by using the small-page-index table 65. The small-page-index table includes a small-page chunk logical page 67 and a quantity 68 of times that each logical page is accessed. A quantity of pages included in each small-page-index table 66 is a quantity of small chunk logical pages included in one large chunk logical page. For example, if the large-page chunk logical page is of 16 K, and the small-page chunk logical page is of 4 K, each small-page-index table 66 records four small-page logical pages. The small-page chunk logical page 67 is selected from the small-page chunk logical page table 51 shown in FIG. 5b, and is used to migrate data in a physical page that corresponds to the large-page chunk logical page 53 and that is in an SSD.

Figure 7:
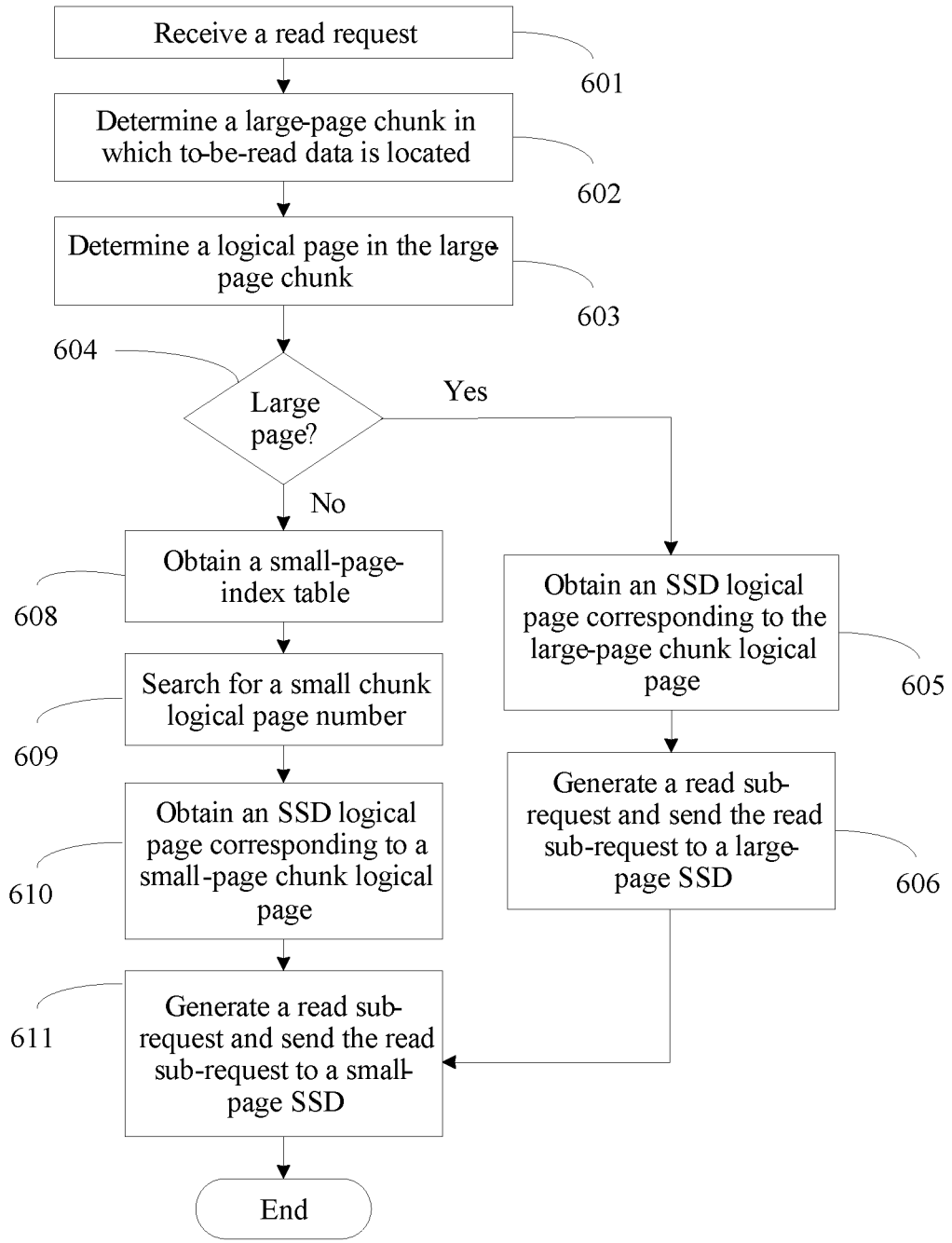
FIG. 7 is a flowchart of a method for processing a read request according to an embodiment of the present disclosure.
Figure 8:
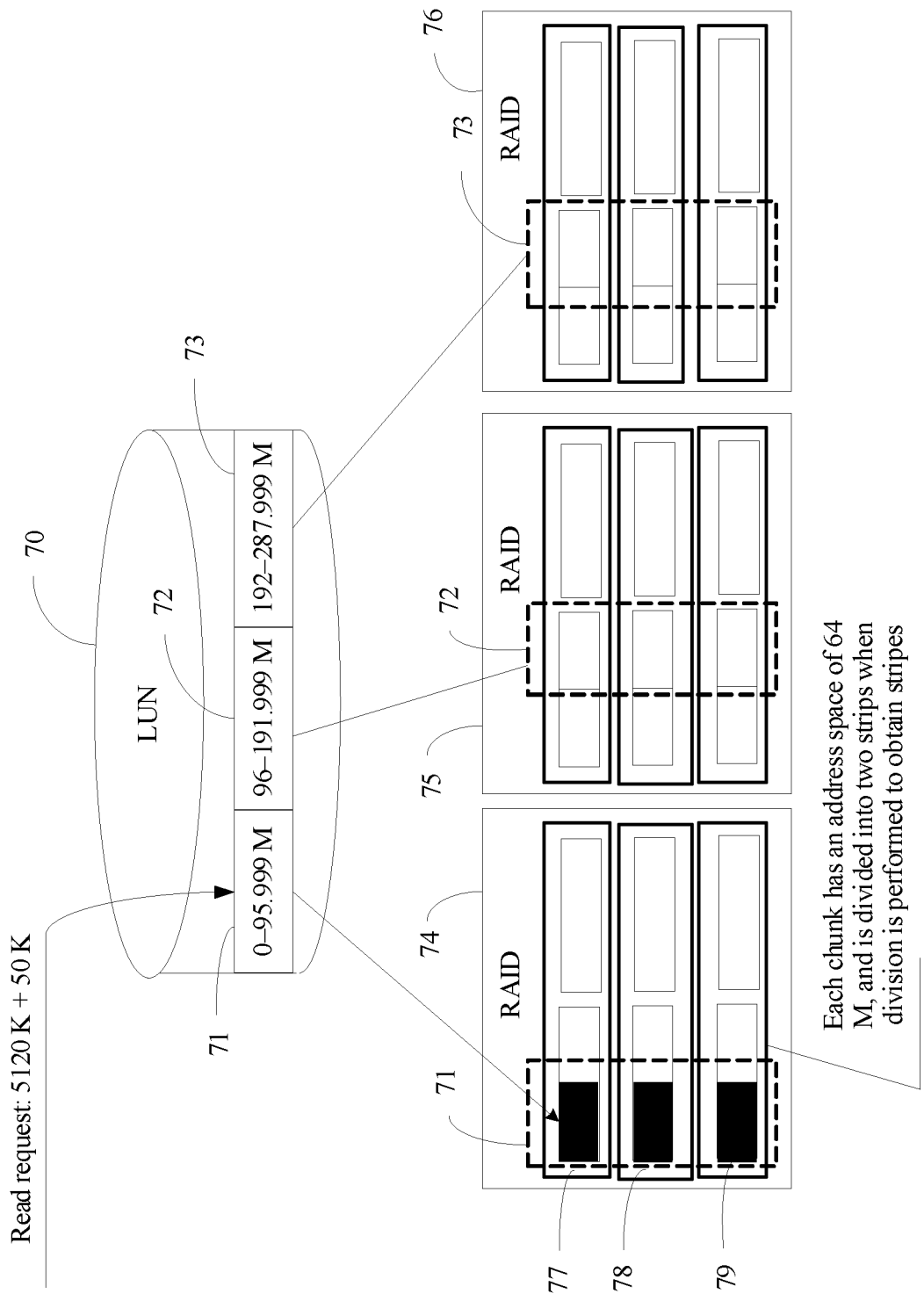
FIG. 8 is a schematic diagram of determining, when processing a read request, a large-page chunk corresponding to a logical address of the read request according to an embodiment of the present disclosure.

For processing, by the controller 301, a received read request based on the logical page tables shown in FIG. 5A and FIG. 5B and the conversion table in FIG. 6 by running the conversion program 311, refer to a flowchart shown in FIG. 7. When an application in the host 100 needs to read data in the storage array 300, the application sends a read request to the storage array 300. The read request carries a logical address of to-be-read data. The logical address includes a logical block address (LBA) and an identifier of a virtual disk. In this embodiment, the identifier of the virtual disk is a logical unit number (LUN). For ease of description, in the following description, the virtual disk is identified by using an LU. The LBA is a logical block defined by a file system of the host 100. A size of a logical block is 512 K. After receiving the read request (S601), the controller 301 of the storage array 300 determines, based on the LUN and the LBA address in the read request, a hybrid-page chunk to which the address of the to-be-read data belongs (S602). FIG. 8 is a schematic diagram of determining, based on a logical address in a read request, a hybrid-page chunk corresponding to to-be-read data. Referring to composition of the LU in FIG. 3, it is assumed that an LU indicated in the read request is an LU 70, and the LU 70 includes three stripes: stripes 71, 72, and 73. If a size of each stripe is 96 M, the three stripes constitute an address space of 288 M. An address space of the stripe 71 is 0 M to 95.999 M, an address space of the stripe 72 is 96 M to 191.999 M, and an address space of the stripe 73 is 192 M to 287.999 M. The stripes 71, 72, and 73 are respectively from RAIDs 74, 75, and 76.

It is assumed that the logical address in the read request is 5120 K+50 K, 5120 K is a start address of the to-be-read data in the LU, and 50 K is a length of the to-be-read data. Based on the start location address, it may be determined that the to-be-read data falls into the address space of the stripe 71. The stripe 71 includes three strips 77, 78, and 79, the three strips are respectively located in three large-page chunks of the RAID 74, and addresses of the three strips in the stripe 71 are contiguous. For example, an address range of the strip 77 is 1 M to 10.333 M, an address range of the strip 78 is 10.334 M to 20.666 M, and an address range of the strip 79 is 20.667 M to 31.999 M. In this way, the controller may further determine that the logical address of the to-be-read data falls into the address range of the strip 77, and may determine a specific location, into which the logical address of the to-be-read data falls, in the strip. After the location in the strip is determined, the logical address of the to-be-read data may be converted into an address in an address space in a large-page chunk.

Based on the address of the to-be-read data in the large-page chunk, a logical page that corresponds to the address and that is in the large-page chunk is determined (S603). A specific method is as follows: A start address of the to-be-read data in the large-page chunk is divided by a page size of the large-page chunk, and rounding is performed, so that a logical page that corresponds to the start address of the to-be-read data and that is in the large-page chunk can be determined. In addition, it is determined, based on the length of the to-be-read data, whether the address of the to-be-read data spans logical pages. If the address spans logical pages, a plurality of logical pages corresponding to the address of the to-be-read data are determined. For example, if the address, in the large-page chunk, of the logical address in the read request is also 5120 K+50 K, a logical page 320 is obtained by dividing 5120 K by 16 K, and the controller may determine that a start logical page is a 320th logical page. Then, a quotient 3 and a remainder 2 are obtained by dividing 50 K by 16 K, it indicates that the to-be-read data occupies four logical pages, numbers of the four logical pages are 320, 321, 322, and 323, and in the logical page 323, only 2 K data needs to be read.

After the logical pages that are in the large-page chunk and to which the address of the to-be-read data belongs are determined, for each logical page, the data annotation column of the conversion table is searched to determine whether a data annotation corresponding to the logical page is a large-page annotation or a small-page annotation (S604). If the data annotation is the large-page annotation, the large-page logical page table is searched for an SSD logical page corresponding to the large-page logical page (S605). A read sub-request carrying the SSD logical page and an address range in the SSD logical page is generated, and the read sub-request is sent to an SSD to which the large-page chunk belongs (S606). After receiving the read sub-request, the SSD may find, in an address mapping table in the SSD based on the SSD logical page in the read sub-request, a physical page corresponding to the SSD logical page, and then read data from the physical page based on the address range.

For example, if data annotations corresponding to the logical page numbers 320 and 321 are large-page annotations, large-page SSD logical pages corresponding to the logical page numbers 320 and 321 are found in the large-page logical page table. Because a length of to-be-read data corresponding to each of the logical page numbers 320 and 321 is a size of a logical page, a length of to-be-read data in a generated read sub-request is the size of the logical page, for example, 16 K.

In step S604, if the data annotation that is of the logical page and that is found in the conversion table by the controller 301 is the small-page annotation, the controller 301 obtains, from the small-page-index table address column of the conversion table, an address that is of a small-page-index table corresponding to the logical page and that is in the memory, and obtains the small-page-index table based on the obtained address (S608). The small-page-index table is searched for a small-page logical page number based on an address range of the to-be-read data in the large-page chunk logical page and a size of a small-page chunk logical page (S609). Then a small-page SSD logical page number corresponding to the small-page chunk logical page number is obtained from the small-page chunk logical page table (S610). The controller 301 generates a read request carrying the small-page SSD logical page number and the length of the to-be-read data, and sends the read request to the small-page SSD (step S611). The small-page SSD obtains an address of a physical page based on the small-page SSD logical page number and a mapping relationship that is stored in the small-page SSD and that is between an SSD logical page number and an address of a physical page, and then reads the to-be-read data from the physical page based on the address of the to-be-read data.

Figure 9:
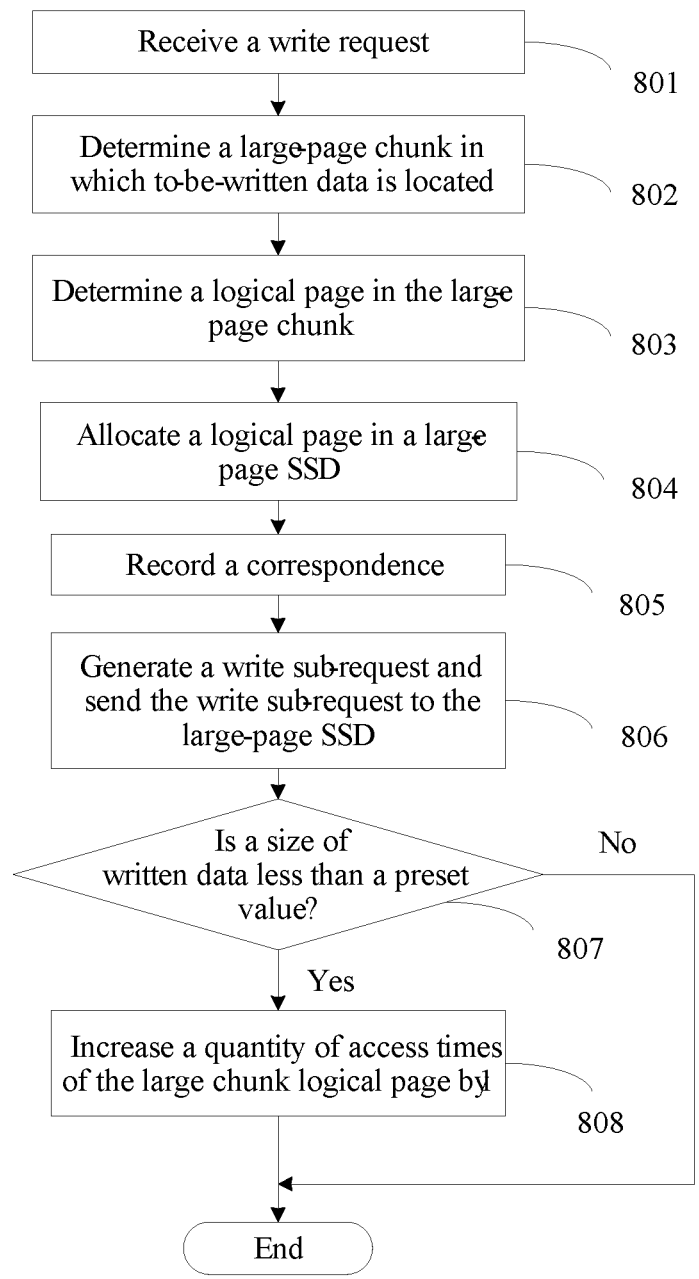
FIG. 9 is a flowchart of a method for processing a write request according to an embodiment of the present disclosure.

For processing, by the controller 301, a received write request based on the tables in FIG. 5A, FIG. 5B, and FIG. 6 by running the conversion program 311, refer to a flowchart of FIG. 9. When an application in the host 100 needs to write data into the storage array 300, the application sends a write request to the storage array 300. The write request includes a logical address of to-be-written data. The write request herein is a write request for writing new data, rather than a rewrite request. The rewrite request is described in a flowchart of FIG. 10A and FIG. 10B. After receiving the write request (step S801), the controller 301 of the storage array 300 determines, based on the logical address in the write request, a large-page chunk in which the to-be-written data is located (step S802), and further determines a logical page in the large-page chunk corresponding to the logical address of the to-be-written data (step S803). Manners of determining the large-page chunk corresponding to the logical address of the to-be-written data and the logical page in the corresponding large-page chunk are the same as determining manners for the to-be-read data. Refer to descriptions of steps S602 and S603 in FIG. 7. Details are not described herein again.

The controller 301 allocates, in a large-page SSD corresponding to the large-page chunk, a logical page in the large-page SSD to the logical page in the large-page chunk (S804), and records, in the large-page logical page table 50, a correspondence between the logical page in the large-page chunk and the logical page in the large-page SSD (S805). The controller 301 generates a write sub-request carrying the logical page in the large-page SSD, and sends the write sub-request to the large-page SSD corresponding to the large-page chunk (S806). After receiving the write sub-request, the SSD may find a blank physical page in the SSD based on the SSD logical page in the write request, to write the to-be-written data. The controller 301 determines whether a size of data written by using the write sub-request is less than a preset value (S807). If the size of the data is less than the preset value, the controller 301 increases, by 1, a quantity of access times of the large chunk logical page in the conversion table (S807). If the size of the data is not less than the preset value, the process ends.

Figure 10A:
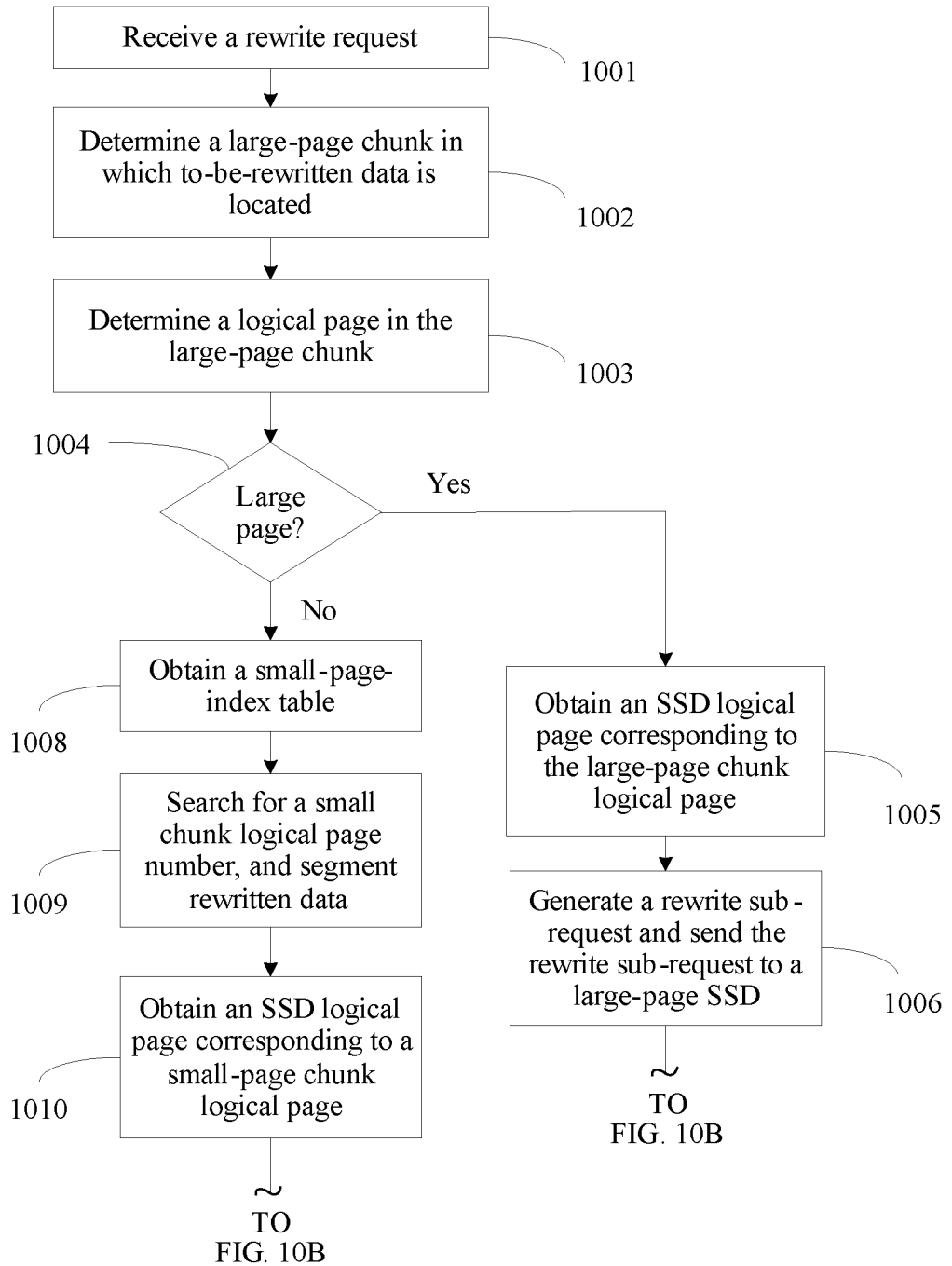
FIG. 10A and FIG. 10B are a flowchart of a method for processing a rewrite request according to an embodiment of the present disclosure.
Figure 10B:
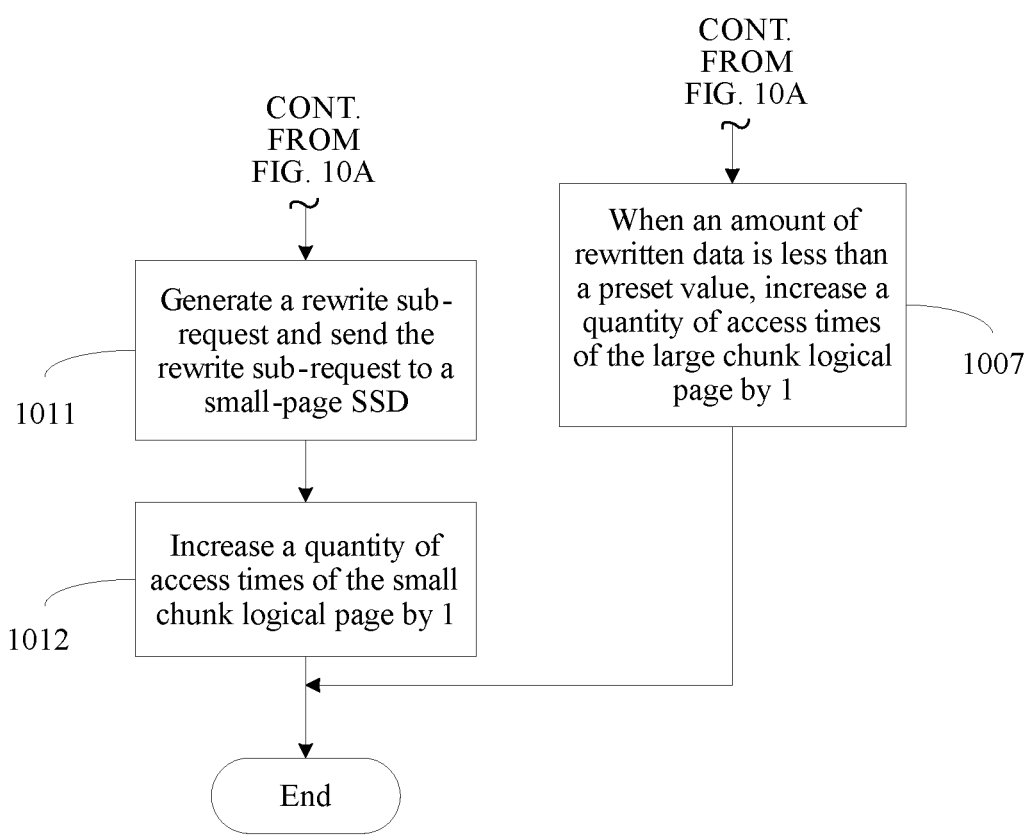

For processing, by the controller, a received rewrite request based on the tables in FIG. 5A, FIG. 5B, and FIG. 6 by running the conversion program, refer to the flowchart of FIG. 10A and FIG. 10B. When the host 100 needs to rewrite data that is written into the storage array 300, the host 100 sends a rewrite request to the storage array 300. The rewrite request includes a logical address of to-be-rewritten data, and rewritten data. The rewritten data is used to replace the written data corresponding to the logical address. After receiving the rewrite request (step S1001), the controller 301 of the storage array 300 determines, based on the logical address in the rewrite request, a large-page chunk in which the to-be-rewritten data is located (step S1002), and further determines a logical page in the large-page chunk corresponding to the logical address of the to-be-rewritten data (step S1003). Manners of determining the large-page chunk corresponding to the logical address of the to-be-rewritten data and the logical page in the corresponding large-page chunk are the same as determining manners for the to-be-read data. Refer to descriptions of steps S602 and S603 in FIG. 7. Details are not described herein again. It should be noted that, when the determined large-page logical page is a plurality of logical pages, a rewritten data page in the rewrite request is segmented based on a size of the logical page, so that each large chunk logical page corresponds to respective rewritten data.

After the logical pages that are in the large-page chunk and to which the address of the to-be-rewritten data belongs are determined, for each logical page, the data annotation column of the conversion table is searched to determine whether a data annotation corresponding to the logical page is a large-page annotation or a small-page annotation (S1004). If the data annotation is the large-page annotation, the large-page logical page table is searched for an SSD logical page corresponding to the large-page logical page (S1005). A rewrite sub-request carrying the SSD logical page and rewritten data corresponding to the large chunk logical page is generated, and the rewrite sub-request is sent to a large-page SSD to which the large-page chunk belongs (S1006). After receiving the rewrite sub-request request, the SSD may find, in an address mapping table in the large-page SSD based on the SSD logical page in the rewrite sub-request, a physical page corresponding to the SSD logical page, invalidate data in the physical page, and write the rewritten data into the blank physical page. If an amount of the rewritten data is less than a preset value, the controller 301 increases, by 1, a quantity of access times corresponding to the large-page chunk logical page in the conversion table (1007).

In step S1004, if the data annotation that is of the logical page and that is found in the conversion table by the controller 301 is the small-page annotation, the controller 301 obtains, from the small-page-index table address column of the conversion table, an address that is of a small-page-index table corresponding to the logical page and that is in the memory, and obtains the small-page-index table based on the obtained address (S1008). The small-page-index table is searched for a small-page chunk logical page number, and the rewritten data is segmented based on a size of the small-page chunk logical page, so that each small-page chunk logical number corresponds to a segment of rewritten data (S1009). Then a small-page SSD logical page number corresponding to the small-page chunk logical page number is obtained from the small-page chunk logical page table (S1010). The controller 301 generates a rewrite sub-request carrying the small-page SSD logical page number, and sends the rewrite sub-request to the small-page SSD (step S1011). The rewrite sub-request further includes the rewritten data corresponding to the small-page chunk logical page number. The small-page SSD invalidates, based on the small-page SSD logical page number and a mapping relationship that is stored in the small-page SSD and that is between an SSD logical page number and a physical page number, a physical page corresponding to the physical page number, and writes the rewritten data into the blank physical page. The controller 301 increases, by 1, a quantity of access times corresponding to the small-page chunk logical page (S1012).

Figure 3:
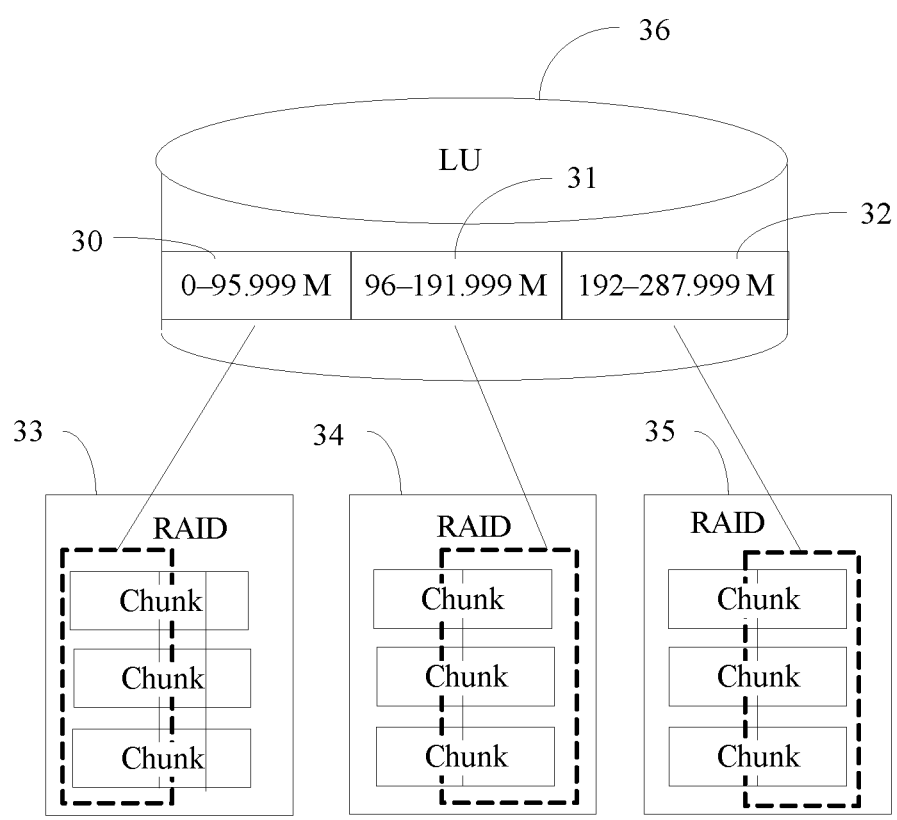
FIG. 3 is a schematic formation diagram of constituting an address space of a logical unit.
Figure 11:
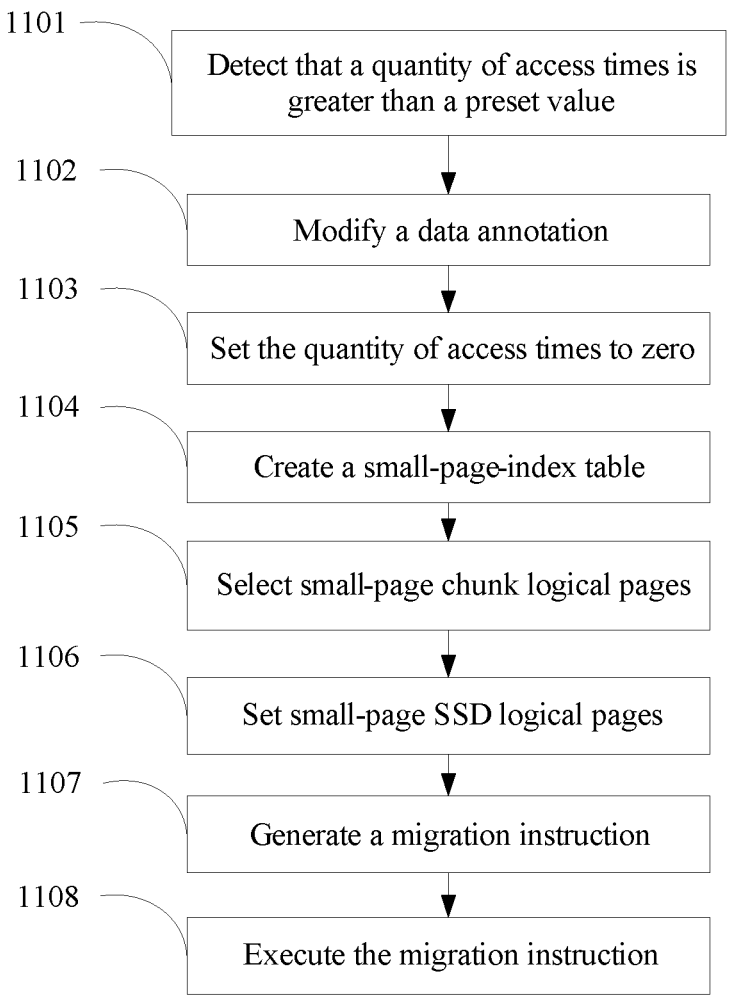
FIG. 11 is a flowchart of a method for migrating data in a large-page SSD to a small-page SSD based on the conversion table in FIG. 6 according to an embodiment of the present disclosure.

As shown in FIG. 11, the controller 301 periodically detects whether a quantity of access times corresponding to each logical page in the conversion table is greater than or equal to a preset value (S1101). For a logical page whose quantity of access times is greater than or equal to the preset value, the controller 301 modifies a data annotation corresponding to the logical page from the large-page annotation to the small-page annotation (step 1102), for example, from 0 to 1, and sets the quantity of access times to zero (S1103). FIG. 3 is a conversion table before detection. When detecting that a quantity of access times corresponding to a logical page 1201 exceeds a preset value 8, as shown in FIG. 12, the controller 301 changes a data annotation 1202 corresponding to the logical page 1201 from 0 to 1, and sets, to zero, a quantity 1203 of access times corresponding to the logical page 1201.

The controller 301 creates a small-page-index table 1204 for the logical page 1201 (S1104), and records, in an STA column 64 corresponding to the logical page 1201, an address YYYY 1205 of the small-page-index table 1204 in the memory. A quantity of small-page chunk logical pages included in the small-page-index table 1204 is a page quantity of small-page chunk logical pages included in the logical page 1201. After the small-page-index table 1204 is created, the controller 301 searches the small-page chunk logical page table 51 for N logical pages that are not used (S1105), and records page numbers of the N logical pages in a small-page chunk logical page number column of the small-page-index table 1204, for example, logical pages 1206 to 1209. An initial quantity of access times of each of the logical pages 1206 to 1209 is 0.

The controller 301 specifies one SSD logical page for each logical page from an SSD space corresponding to a small-page chunk to which the logical pages 1206 to 1209 belong (S1206), and records each SSD logical page in a small-page SSD logical page number column that is in the small chunk logical page table and that corresponds to the logical pages 1206 to 1209. The controller 301 generates a migration instruction (S1207). A source address in the migration instruction is a large-page SSD logical page corresponding to the logical page 1201. A destination address in the migration instruction is small-page SSD logical pages corresponding to the logical pages 1206 to 1209. The controller 301 executes the migration instruction (S1208), to migrate data corresponding to the large-page SSD logical page corresponding to the logical page 1201 from a large-page SSD to locations, in the small-page SSD, of the small-page SSD logical pages corresponding to the logical pages 1206 to 1209. After the data migration is completed, the controller 301 deletes a large-page SSD logical page number that is in the large chunk logical page table and that corresponds to the logical page 1201. In this way, small data that is accessed relatively frequently can be stored in a small-page SSD to reduce write amplification in a garbage collection process, thereby reducing write amplification while ensuring writing efficiency of the SSD.

The small-page-index table further records a quantity of times that each small chunk logical page is accessed. At an interval of a time period, for quantities of access times of logical pages in each small-page-index table, if a variance is less than a threshold T1 and a mean value is greater than a threshold T2, the controller merges data corresponding to the logical pages in the small-page-index table, and migrates the data from a small-page SSD to a large-page SSD. The quantities of access times in the small-page-index table are set to zero at an interval of a time period, so that a calculation result reflects a data access feature in a recent time period.

Figure 13:
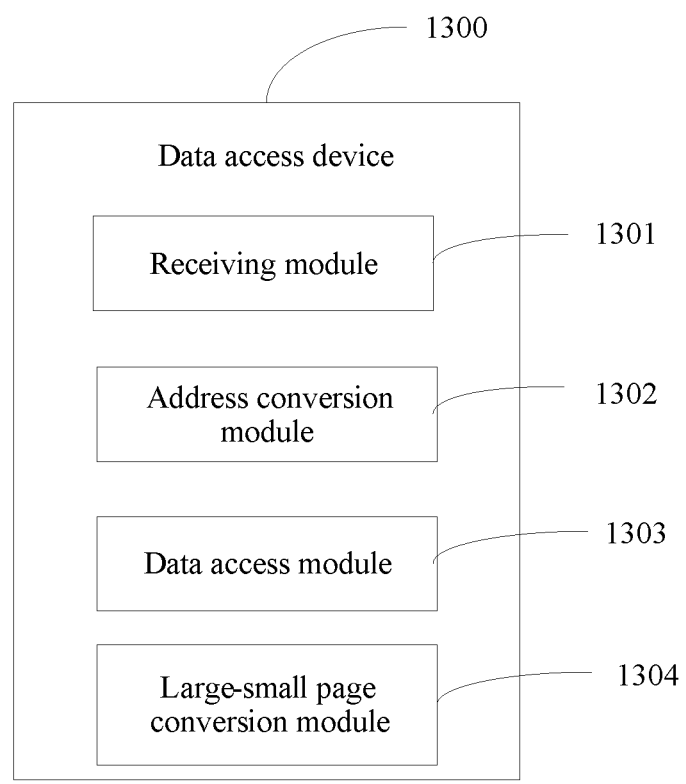
FIG. 13 is a module diagram of a data access device according to an embodiment of the present disclosure.

FIG. 13 is a module diagram of a data access device 1300 according to an embodiment of the present disclosure. The data access device 1300 includes a receiving module 1301, an address conversion module 1302, a data access module 1303, and a large-small page conversion module 1304. The receiving module 1301 is configured to receive a data access request sent by a host. The data access request is used for accessing requested data stored in a storage array, and the data access request carries a logical address of the requested data. The logical address is a logical address of the LU in FIG. 3. For composition of the LU, refer to the description of FIG. 3. The access request may be a read request, a write request, or a rewrite request. For a function performed by the receiving module 1301, refer to descriptions of step S601 in FIG. 7, step S801 in FIG. 9, and step S1001 in FIG. 10A.

The address conversion module 1302 is configured to search for a large-page chunk logical page corresponding to the logical address and a corresponding logical page address in the large-page chunk logical page. The large-page chunk logical page belongs to a large-page logical block of a hybrid-page logical block. For a specific search process, refer to related descriptions of FIG. 8 and steps S602 and S603 in FIG. 7.

The data access module 1303 is configured to: search a conversion table corresponding to the hybrid-page chunk for a data annotation corresponding to the large-page chunk logical page; when the data annotation is a small-page annotation, obtain a small-page-index table based on a small-page-index table address that is recorded in the conversion table and that corresponds to the large-page chunk logical page, and determine, based on the logical page address and in small-page chunk logical pages recorded in the small-page-index table, a small-page chunk logical page corresponding to the large-page chunk logical page and an address in the small-page chunk logical page, where a storage space that corresponds to the small-page chunk logical page corresponding to the large-page chunk logical page and that is of a small-page SSD is used to store data migrated from a storage space that corresponds to the large-page chunk logical page and that is of a large-page SSD; and obtain the requested data from the small-page SSD based on the small-page chunk logical page and the address in the small-page chunk logical page. When the data annotation corresponding to the large-page chunk logical page is a large-page annotation, the data access module 1303 is further configured to obtain the requested data from the large-page SSD based on the large-page chunk logical page and the large-page address.

When obtaining the requested data from the small-page SSD based on the small-page chunk logical page and the address in the small-page chunk logical page, the data access module 1303 is configured to: obtain, from the small-page chunk logical page table, a logical page in the small-page SSD and a logical page address in the small-page SSD that correspond to the small-page chunk logical page and the address in the small-page chunk logical page; generate an access sub-request, where the access sub-request carries the logical page and the logical page address in the small-page SSD; and send the access sub-request to the small-page SSD to instruct the small-page SSD to obtain to-be-accessed data based on the logical page and the logical page address in the small-page SSD.

When obtaining the requested data from the large-page SSD based on the large-page chunk logical page and the large-page address, the data access module 1303 is configured to: obtain, from a large-page chunk logical page table, a logical page that corresponds to the large-page chunk logical page and that is in the large-page SSD, and determine a logical page address that corresponds to the large-page address and that is in the large-page SSD; generate an access sub-request, where the access sub-request carries the logical page and the logical page address in the large-page SSD; and send the access sub-request to the large-page SSD to instruct the large-page SSD to obtain the requested data based on the logical page and the logical page address in the large-page SSD.

For a function performed by the data access module 1303, refer to descriptions of steps S604 to S610 in FIG. 7 and steps S1004 to S1012 in FIG. 10A and FIG. 10B.

The large-small page conversion module 1304 is configured to: periodically detect, in the conversion table, a large-page chunk logical page whose quantity of access times is greater than a preset value, create a small-page-index table for the large-page chunk logical page whose quantity of access times is greater than the preset value, and record an address of the small-page-index table in the conversion table, where the small-page-index table records N blank small-page chunk logical pages, N is a quantity of small-page chunk logical pages included in each large-page chunk logical page, and N≥1; migrate, to a storage space that corresponds to the blank small-page chunk logical pages and that is of the small-page SSD, data that is stored in the large-page SSD and that corresponds to the large-page chunk logical page whose quantity of access times is greater than the preset value; modify, to the small-page annotation, a data annotation of the large-page chunk logical page whose quantity of access times is greater than the preset value; and set, to zero, the quantity of access times of the large-page chunk logical page whose quantity of access times is greater than the preset value.

The large-small page conversion module 1304 is further configured to: calculate, at an interval of a preset time, a variance and a mean value of quantities of access times corresponding to all small-page logical pages in the small-page-index table; and if the variance is less than a threshold T1 and the mean value is greater than a threshold T2, migrate, to the large-page SSD corresponding to a large-page chunk logical page corresponding to the small-page-index table, data that corresponds to the small-page logical pages and that is in the small-page SSD.

For a function performed by the large-small page conversion module, refer to a related description of FIG. 11.

The foregoing descriptions are merely specific implementations of the present disclosure, but not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data access method implemented by a processor of a storage array, the data access method comprising:
receiving, from a host, a first data access request for accessing first data stored in the storage array, wherein the first data access request carries a first logical address of the first data, wherein the storage array comprises first solid-state disks (SSDs) and second SSDs, wherein a page size of each first SSD is greater than a page size of each second SSD, wherein a logical address space formed by the first SSDs is divided into large-page logical blocks, wherein each large-page logical block is divided into large-page logical pages based on the page size of the first SSD, wherein a logical address space constituted by the second SSDs is divided into small-page logical blocks, wherein each small-page logical block is divided into small-page logical pages based on the page size of the second SSD, wherein a large-page logical block and a small-page logical block constitute a hybrid-page logical block, wherein a logical unit provided for the host for use is constructed based on the large-page logical block in the hybrid-page logical block, wherein a conversion table is set for each hybrid-page logical block, and wherein the conversion table records a mapping relationship between a large-page logical page, a data annotation, and a small-page-index table address;
- searching for a first large-page logical page corresponding to the first logical address and a large-page logical page address of the first large-page logical page, wherein the first large-page logical page belongs to a large-page logical block of a first hybrid-page logical block;
- searching a conversion table corresponding to the first hybrid-page logical block for a first data annotation corresponding to the first large-page logical page;
- obtaining a small-page-index table based on a small-page-index table address that is recorded in the conversion table and that corresponds to the first large-page logical page when the first data annotation is a small-page annotation, wherein the small-page annotation indicates that data corresponding to the first large-page logical page is stored in a small-page SSD corresponding to a small-page chunk;
- determining, in the small-page-index table based on the large-page logical page address, a small-page logical page corresponding to the large-page logical page address and a small-page logical page address of the small-page logical page, wherein a storage space that corresponds to the small-page logical page address and that is of a second SSD is for storing data migrated from a storage space that corresponds to the large-page logical page address and that is of a first SSD; and
- obtaining the first data from the second SSD based on the small-page logical page address.

2. The data access method of claim 1, further comprising:
- receiving, from the host, a second data access request that is for accessing second data stored in the storage array, wherein the second data access request carries a logical address of the second data;
- searching for a second large-page logical page corresponding to the logical address of the second data and a large-page logical page address in the second large-page logical page, wherein the second large-page logical page belongs to a large-page logical block of a second hybrid-page logical block;
- searching a conversion table corresponding to the second hybrid-page logical block for a data annotation corresponding to the second large-page logical page; and
- obtaining the second data from the first SSD based on the large-page logical page address in the second large-page logical page when the data annotation corresponding to the second large-page logical page is a large-page annotation.

3. The data access method of claim 2, wherein the conversion table further records a quantity of access times of each large-page logical page, and wherein the data access method further comprises increasing by 1 a quantity of access times of the second large-page logical page in which an amount of the data obtained from the first SSD is less than a preset value when the second data access request is a rewrite request.

4. The data access method of claim 2, wherein a large-page logical block in each hybrid-page logical block has a large-page logical page table, wherein the large-page logical page table records a correspondence between a large-page logical page comprised in each large-page logical block and a logical page in the first SSD; and wherein the data access method further comprises:
- obtaining, from the large-page logical page table, a logical page that corresponds to the second large-page logical page and that is in the first SSD;
- determining a logical page address that corresponds to the large-page logical page address and that is in the first SSD;
- generating an access sub-request, wherein the access sub-request carries the logical page and the logical page address in the first SSD; and
- sending the access sub-request to the first SSD to instruct the first SSD to obtain, based on the logical page and the logical page address in the first SSD, the data requested in the access sub-request.

5. The data access method of claim 1, further comprising:
- periodically detecting in the conversion table a large-page logical page whose quantity of access times is greater than a preset value;
- creating a small-page-index table for the large-page logical page whose quantity of access times is greater than the preset value;
- recording an address of the small-page-index table in the conversion table, wherein the small-page-index table records N blank small-page logical pages, N is a quantity of small-page logical pages comprised in each large-page logical page, and N≥1;
- migrating, to a storage space that corresponds to the N blank small-page logical pages and that is of the second SSD, data that is stored in the first SSD and that corresponds to the large-page logical page whose quantity of access times is greater than the preset value;
- modifying in the small-page annotation a data annotation of the large-page logical page whose quantity of access times is greater than the preset value; and
- setting to zero the quantity of access times of the large-page logical page whose quantity of access times is greater than the preset value.

6. The data access method of claim 5, wherein the small-page-index table records a quantity of access times of each small-page logical page, and wherein the data access method further comprises:
- calculating, at an interval of a preset time, a variance and a mean value of quantities of access times corresponding to all the N blank small-page logical pages in the small-page-index table; and
- migrating, to the first SSD corresponding to a large-page logical page corresponding to the small-page-index table when the variance is less than a threshold T1 and the mean value is greater than a threshold T2, data that corresponds to the N blank small-page logical pages and that is in the second SSD.

7. The data access method of claim 1, wherein a small-page logical block in each hybrid-page logical block has a small-page logical page table, wherein the small-page logical page table records a correspondence between a small-page logical page comprised in each small-page logical block and a logical page in the second SSD and wherein the data access method further comprises:

obtaining, from the small-page logical page table, a logical page and a logical page address of the logical page in the second SSD that correspond to each small-page logical page and a small-page logical page address of the small-page logical page;

generating an access sub-request for each logical page and a logical page address of the logical page in the second SSD, wherein each access sub-request carries one logical page and one logical page address in the second SSD; and sending the access sub-request to the second SSD to instruct the second SSD to obtain the first data based on the logical page and the logical page address of the logical page in the second SSD.

8. A storage array comprising:

first solid state disks (SSDs);

second SSDs, wherein a page size of each first SSD is greater than a page size of each second SSD, wherein a logical address space constituted by the first SSDs is divided into large-page logical blocks, wherein each large-page logical block is divided into large-page logical pages based on the page size of the first SSD, wherein a logical address space constituted by the second SSDs is divided into small-page logical blocks, wherein each small-page logical block is divided into small-page logical pages based on the page size of the second SSD, wherein a large-page logical block and a small-page logical block constitute a hybrid-page logical block, wherein a logical unit provided for a host for use is constructed based on the large-page logical block in the hybrid-page logical block, wherein a conversion table is set for each hybrid-page logical block, and wherein the conversion table records a mapping relationship between a large-page logical page, a data annotation, and a small-page-index table address; and a processor configured to:

receive, from the host, a first data access request for accessing first data stored in the storage array, wherein the first data access request carries a first logical address of the first data;

search for a first large-page logical page corresponding to the first logical address and a large-page logical page address of the first large-page logical page, wherein the first large-page logical page belongs to a large-page logical block of a first hybrid-page logical block;

search a conversion table corresponding to the first hybrid-page logical block for a first data annotation corresponding to the first large-page logical page;

obtain a small-page-index table based on a small-page-index table address that is recorded in the conversion table and that corresponds to the first large-page logical page when the first data annotation is a small-page annotation, wherein the small-page annotation indicates that data corresponding to the first large-page logical page is stored in a small-page SSD corresponding to a small-page chunk;

determine, in the small-page-index table based on the large-page logical page address, a small-page logical page corresponding to the large-page logical page address and a small-page logical page address of the small-page logical page, wherein a storage space that corresponds to the small-page logical page address and that is of a second SSD is for storing data migrated from a storage space that corresponds to the large-page logical page address and that is of a first SSD; and obtain the first data from the second SSD based on the small-page logical page address.

9. The storage array of claim 8, wherein the processor is further configured to:

receive, from the host, a second data access request that is for accessing second data stored in the storage array, wherein the second data access request carries a logical address of the second data;

search for a second large-page logical page corresponding to the logical address of the second data and a large-page logical page address in the second large-page logical page, wherein the second large-page logical page belongs to a large-page logical block of a second hybrid-page logical block;

search a conversion table corresponding to the second hybrid-page logical block for a data annotation corresponding to the second large-page logical page; and obtain the second data from the first SSD based on the large-page logical page address in the second large-page logical page when the data annotation corresponding to the second large-page logical page is a large-page annotation.

10. The storage array of claim 9, wherein the conversion table further records a quantity of access times of each large-page logical page, and wherein the processor is further configured to increase by 1 a quantity of access times of the second large-page logical page in which an amount of the data obtained from the first SSD is less than a preset value when the second data access request is a rewrite request.

11. The storage array of claim 9, wherein a large-page logical block in each hybrid-page logical block has a large-page logical page table, wherein the large-page logical page table records a correspondence between a large-page logical page comprised in each large-page logical block and a logical page in the first SSD; and wherein the processor is further configured to:

obtain, from the large-page logical page table, a logical page that corresponds to the second large-page logical page and that is in the first SSD;

determine a logical page address that corresponds to the large-page logical page address and that is in the first SSD;

generate an access sub-request, wherein the access sub-request carries the logical page and the logical page address in the first SSD; and send the access sub-request to the first SSD to instruct the first SSD to obtain, based on the logical page and the logical page address in the first SSD, the data requested in the access sub-request.

12. The storage array of claim 8, wherein the processor is further configured to:

periodically detect in the conversion table a large-page logical page whose quantity of access times is greater than a preset value;

create a small-page-index table for the large-page logical page whose quantity of access times is greater than the preset value;

record an address of the small-page-index table in the conversion table, wherein the small-page-index table records N blank small-page logical pages, N is a quantity of small-page logical pages comprised in each large-page logical page, and N≥1;

migrate, to a storage space that corresponds to the N blank small-page logical pages and that is of the second SSD, data that is stored in the first SSD and that corresponds to the large-page logical page whose quantity of access times is greater than the preset value;

modify to the small-page annotation a data annotation of the large-page logical page whose quantity of access times is greater than the preset value; and set to zero the quantity of access times of the large-page logical page whose quantity of access times is greater than the preset value.

13. The storage array of claim 12, wherein the small-page-index table records a quantity of access times of each small-page logical page, and wherein the processor is further configured to:

calculate, at an interval of a preset time, a variance and a mean value of quantities of access times corresponding to all the N blank small-page logical pages in the small-page-index table; and migrate, to the first SSD corresponding to a large-page logical page corresponding to the small-page-index table when the variance is less than a threshold T1 and the mean value is greater than a threshold T2, data that corresponds to the N blank small-page logical pages and that is in the second SSD.

14. The storage array of claim 8, wherein a small-page logical block in each hybrid-page logical block has a small-page logical page table, wherein the small-page logical page table records a correspondence between a small-page logical page comprised in each small-page logical block and a logical page in the second SSD; and wherein the processor is further configured to:

obtain, from the small-page logical page table, a logical page and a logical page address of the logical page in the second SSD that correspond to each small-page logical page and a small-page logical page address of the small-page logical page;

generate an access sub-request for each logical page and a logical page address of the logical page in the second SSD, wherein each access sub-request carries one logical page and one logical page address in the second SSD; and send the access sub-request to the second SSD to instruct the second SSD to obtain the first data based on the logical page and the logical page address of the logical page in the second SSD.

15. A computer program product comprising computer-executable instructions that are stored on a non-transitory computer-readable medium and that, when executed by a processor, cause an apparatus to:

receive, from a host, a first data access request for accessing first data stored in a storage array, wherein the first data access request carries a first logical address of the first data, wherein the storage array comprises first solid-state disks (SSDs) and second SSDs, wherein a page size of each first SSD is greater than a page size of each second SSD, wherein a logical address space formed by the first SSDs is divided into large-page logical blocks, wherein each large-page logical block is divided into large-page logical pages based on the page size of the first SSD, wherein a logical address space constituted by the second SSDs is divided into small-page logical blocks, wherein each small-page logical block is divided into small-page logical pages based on the page size of the second SSD, wherein a large-page logical block and a small-page logical block constitute a hybrid-page logical block, wherein a logical unit provided for the host for use is constructed based on the large-page logical block in the hybrid-page logical block, wherein a conversion table is set for each hybrid-page logical block, and wherein the conversion table records a mapping relationship between a large-page logical page, a data annotation, and a small-page-index table address;

search for a first large-page logical page corresponding to the first logical address and a large-page logical page address of the first large-page logical page, wherein the first large-page logical page belongs to a large-page logical block of a first hybrid-page logical block;

search a conversion table corresponding to the first hybrid-page logical block for a first data annotation corresponding to the first large-page logical page;

obtain a small-page-index table based on a small-page-index table address that is recorded in the conversion table and that corresponds to the first large-page logical page when the first data annotation is a small-page annotation, wherein the small-page annotation indicates that data corresponding to the first large-page logical page is stored in a small-page SSD corresponding to a small-page chunk;

determine, in the small-page-index table based on the large-page logical page address, a small-page logical page corresponding to the large-page logical page address and a small-page logical page address of the small-page logical page, wherein a storage space that corresponds to the small-page logical page address and that is of a second SSD is for storing data migrated from a storage space that corresponds to the large-page logical page address and that is of a first SSD; and obtain the first data from the second SSD based on the small-page logical page address.

16. The computer program product of claim 15, wherein the instructions further cause the apparatus to:

receive, from the host, a second data access request that is for accessing second data stored in the storage array, wherein the second data access request carries a logical address of the second data;

search for a second large-page logical page corresponding to the logical address of the second data and a large-page logical page address in the second large-page logical page, wherein the second large-page logical page belongs to a large-page logical block of a second hybrid-page logical block;

search a conversion table corresponding to the second hybrid-page logical block for a data annotation corresponding to the second large-page logical page; and obtain the second data from the first SSD based on the large-page logical page address in the second large-page logical page when the data annotation corresponding to the second large-page logical page is a large-page annotation.

17. The computer program product of claim 16, wherein the conversion table further records a quantity of access times of each large-page logical page, and wherein the instructions further cause the apparatus to increase by 1 a quantity of access times of the second large-page logical page in which an amount of the data obtained from the first SSD is less than a preset value when the second data access request is a rewrite request.

18. The computer program product of claim 16, wherein a large-page logical block in each hybrid-page logical block has a large-page logical page table, wherein the large-page logical page table records a correspondence between a large-page logical page comprised in each large-page logical block and a logical page in the first SSD; and wherein the instructions further cause the apparatus to:

obtain, from the large-page logical page table, a logical page that corresponds to the second large-page logical page and that is in the first SSD;

determine a logical page address that corresponds to the large-page logical page address and that is in the first SSD;

generate an access sub-request, wherein the access sub-request carries the logical page and the logical page address in the first SSD; and send the access sub-request to the first SSD to instruct the first SSD to obtain, based on the logical page and the logical page address in the first SSD, the data requested in the access sub-request.

19. The computer program product of claim 15, wherein the instructions further cause the apparatus to:

periodically detect in the conversion table a large-page logical page whose quantity of access times is greater than a preset value;

create a small-page-index table for the large-page logical page whose quantity of access times is greater than the preset value;

record an address of the small-page-index table in the conversion table, wherein the small-page-index table records N blank small-page logical pages, N is a quantity of small-page logical pages comprised in each large-page logical page, and N≥1;

migrate, to a storage space that corresponds to the N blank small-page logical pages and that is of the second SSD, data that is stored in the first SSD and that corresponds to the large-page logical page whose quantity of access times is greater than the preset value;

modify to the small-page annotation a data annotation of the large-page logical page whose quantity of access times is greater than the preset value; and set to zero the quantity of access times of the large-page logical page whose quantity of access times is greater than the preset value.

20. The computer program product of claim 19, wherein the small-page-index table records a quantity of access times of each small-page logical page, and wherein the instructions further cause the apparatus to:

calculate, at an interval of a preset time, a variance and a mean value of quantities of access times corresponding to all the N blank small-page logical pages in the small-page-index table; and migrate, to the first SSD corresponding to a large-page logical page corresponding to the small-page-index table when the variance is less than a threshold T1 and the mean value is greater than a threshold T2, data that corresponds to the N blank small-page logical pages and that is in the second SSD.

* * * * *